US008239246B1

(12) United States Patent
Bigham et al.

(10) Patent No.: US 8,239,246 B1
(45) Date of Patent: *Aug. 7, 2012

(54) HEALTH AND LIFE SCIENCES PAYER HIGH PERFORMANCE CAPABILITY ASSESSMENT

(75) Inventors: Elizabeth Bigham, Shoreline, WA (US); Thomas Heatherington, Pittsburgh, PA (US); Gwen E. Houser, Seattle, WA (US); Corissa G. Leung, San Francisco, CA (US); Kimberley O. Mentzer, Cockeysville, MD (US); Michelle W. Spiliotes, Concord, NH (US); Richard A. Stewart, Dublin, OH (US)

(73) Assignee: Accenture Global Services Limited, Dublin (IE)

( * ) Notice: Subject to any disclaimer, the term of this patent is extended or adjusted under 35 U.S.C. 154(b) by 417 days.

This patent is subject to a terminal disclaimer.

(21) Appl. No.: 12/548,673

(22) Filed: Aug. 27, 2009

(51) Int. Cl.
*G06Q 10/00* (2012.01)
(52) U.S. Cl. .................................... 705/7.38; 705/7.39
(58) Field of Classification Search .................. 705/7.38, 705/7.39
See application file for complete search history.

(56) References Cited

U.S. PATENT DOCUMENTS

| | | | |
|---|---|---|---|
| 6,256,773 B1 | 7/2001 | Bowman-Amuah | |
| 6,324,647 B1 | 11/2001 | Bowman-Amuah | |
| 6,370,573 B1 | 4/2002 | Bowman-Amuah | |
| 6,601,233 B1 | 7/2003 | Underwood | |
| 6,957,186 B1 | 10/2005 | Guheen et al. | |
| 2002/0035495 A1 | 3/2002 | Spira et al. | |
| 2003/0083912 A1* | 5/2003 | Covington et al. | 705/7 |
| 2003/0110067 A1 | 6/2003 | Miller et al. | |
| 2004/0098299 A1* | 5/2004 | Ligon et al. | 705/10 |

OTHER PUBLICATIONS

U.S. Appl. No. 11/823,112, filed Jun. 25, 2007.
U.S. Appl. No. 12/124,010, filed May 20, 2008.
U.S. Appl. No. 12/129,080, filed May 29, 2008.
U.S. Appl. No. 61/086,927, filed Aug. 7, 2008.
U.S. Appl. No. 12/194,793, filed Aug. 20, 2008.
U.S. Appl. No. 61/092,225, filed Aug. 27, 2008.
U.S. Appl. No. 12/324,150, filed Nov. 26, 2008.
U.S. Appl. No. 61/154,832, filed Feb. 24, 2009.
U.S. Appl. No. 61/154,945, filed Feb. 24, 2009.
U.S. Appl. No. 61/164,640, filed Mar. 30, 2009.
U.S. Appl. No. 61/164,618, filed Mar. 30, 2009.
U.S. Appl. No. 12/427,201, filed Apr. 21, 2009.
U.S. Appl. No. 12/471,767, filed May 26, 2009.
U.S. Appl. No. 12/479,310, filed Jun. 5, 2009.
U.S. Appl. No. 12/701,914, filed Feb. 8, 2010.
U.S. Appl. No. 12/710,900, filed Feb. 23, 2010.
U.S. Appl. No. 12/710,662, filed Feb. 23, 2010.
U.S. Appl. No. 12/713,647, filed Feb. 26, 2010.
U.S. Appl. No. 12/713,597, filed Feb. 26, 2010.

(Continued)

*Primary Examiner* — Jonathan G Sterrett
*Assistant Examiner* — Nadja Chong Cruz
(74) *Attorney, Agent, or Firm* — Brinks Hofer Gilson & Lione

(57) ABSTRACT

A high-performance capability assessment model helps a health and life sciences business meet the challenges of the global marketplace. As a result, the health and life sciences business can achieve the clarity, consistency, and well-defined execution of core processes that reduce inefficiencies and waste that result from unnecessary process complexity and exceptions. In addition, the high-performance capability assessment model helps the health and life sciences business to identify specific areas in which improvements may be made, to understand how to make said improvements, and to establish levels of capability along the way to reaching an ultimate capability goal.

18 Claims, 14 Drawing Sheets

OTHER PUBLICATIONS

Brochure, "High Performance Acceleration: Global Retail Process Model," Accenture, High Performance Delivered, 2007.

Handbook, Software Engineering Institute, "A Description of the Systems Engineering Capability Maturity Model Appraisal Method Version 1.1," Mar. 1996.

Keith A. Heston, "Achieving Delivery Excellence Using the Capability Maturity Model Integration," *Accenture, High Performance Delivered*, 2006.

Report, Software Engineering Institute, "A Systems Engineering Capability Maturity Model, Version 1.1.," Nov. 1995.

Walker Royce, "CMM vs. CMMI: From Conventional to Modern Software Management," *The Rational Edge*, 2002.

Non-Final Office Action dated Apr. 28, 2011, issued in related U.S. Appl. No. 12/129,080.

* cited by examiner

HEALTH AND LIFE SCIENCES PAYER HIGH PERFORMANCE CAPABILITY ASSESSMENT

BACKGROUND OF THE INVENTION

1. Technical Field

This disclosure concerns a system and method to identify the performance of an organization on a scale of mastery across representative capabilities of the organization's industry. In particular, this disclosure relates to an efficient and cost effective way to assess the performance level of key capability areas within the processes of a health and life sciences organization, and in particular a payer in a health and life sciences organization.

2. Background Information

Modern health and life sciences organizations operate in an increasingly challenging environment. To survive, health and life sciences organizations must adapt to this environment and execute in a clear, consistent, and efficient manner. Furthermore, the competitive nature, regulatory requirements, low profit margins, and competitive challenges of health and life sciences businesses greatly increase the complexity and difficulty of surviving on a day-to-day basis.

Despite the need for a health and life sciences organization to meet the challenges of the global marketplace, it is still often the case that the business lacks clarity, consistency, and well-defined execution of its core processes. These shortcomings severely constrain the business, and lead directly to inefficiencies and waste due to unnecessary complexity, process exceptions, and customer dissatisfaction. At the same time, it can be very difficult to identify specific processes to which improvements may be made, either because the business itself does not have the expertise to identify the processes or because the complexities of the business frustrate attempts to clearly delineate the processes to be improved.

Even if the health and life sciences business, on its own, could identify one of the many processes that it needs to improve, the business would not necessarily know how to improve the process or be able to identify a concrete and measurable improvement goal. Another difficulty exists in determining whether there are any intermediate goals that should be reached along the way. As health and life sciences businesses struggle to meet the demands of the modern economic landscape, they fail to identify opportunities for maximizing sales and margin improvement, category expansion, multi-channel execution, customer satisfaction improvement, and to reach other important goals.

Therefore, a need exists for an efficient and effective system and method to assess the performance level of key assessment areas within the processes of an organization.

SUMMARY

A high-performance capability assessment (HPCA) model helps health and life sciences businesses meet the challenges of the global marketplace by defining a scale of performance mastery along which the current practices of the business may be located. The HPCA model accelerates the discovery of process and performance gaps within business operations. In addition, the HPCA model also helps the business to identify specific areas in which improvements may be made, how to make the improvements, and how to establish performance measures during the course of attempting to achieve an ultimate goal. As a result, the business can achieve the clarity, consistency, and well-defined execution of core processes that maximize the operating budget for optimum outcomes.

The HPCA model includes a key factor dimension and a performance mastery scale dimension. The performance mastery scale dimension defines multiple mastery levels. The performance mastery levels form a scale of increasing organizational performance. The scale includes a 'Basic' mastery level, a 'Competitive' mastery level, and a 'Market Leading' mastery level along a horizontal axis. Each performance mastery level includes criteria specific to a corresponding key assessment area. Each key assessment area identifies some aspect of a capability of a health and life sciences business with respect to a payer organization, such as for example, an insurance company when dealing with the private sector.

A business capability can be defined as a bundle of closely integrated skills, knowledge, technologies, and cumulative learning that is exercised through a set of processes and that collectively represents an organization's ability to create value by producing outcomes and results. Capability areas do not represent a delineation of organizational responsibilities as the business outcomes of a capability may be the result of a number of cross-functional teams. Capabilities of a business may be grouped into areas and/or platforms, including platforms and sub-platforms, depending on the organizational structure of the business.

For example, the HPCA model groups the capabilities of the health and life sciences industry for a payer into five main areas or high-level platforms, which may also be thought of as "business areas," namely a direct and guide the organization platform, a develop and maintain market platform, a coordinate health care services platform, a manage operations platform, and a support the organization platform. Each platform includes multiple platforms and/or sub-platforms. For example, the coordinate health care services platform may include four sub-platforms, namely a perform health care management sub-platform, a develop and manage networks sub-platform, a service the networks sub-platform, and a manage pharmacy sub-platform.

Some of the platforms and sub-platforms may include additional or further sub-platforms or granularity, while others may not, and may also include capabilities at their lowest level. Examples of capabilities within the perform health care management sub-platform, include for example, design and incentives capabilities, segment and target capabilities, reach and engage capabilities, collaborate and support capabilities, evaluate and improve capabilities, and a cross-core functions capabilities.

The key factor dimension establishes a set of key assessment areas in which to analyze the capabilities of a business. Key assessment areas include performance capability criteria. Performance capability criteria populate the performance capability assessment model. The performance capability criteria may be specific to any one of many different business capabilities. Any number of performance capability assessment models and performance capability criteria may be defined and stored in a capability detail pool for subsequent retrieval and application to a business under examination. Accordingly, the HPCA model provides a flexible and adaptive scale of performance capability against which business practices may be compared to ascertain where the capabilities of a business under examination fall along the scale.

Other systems, methods, features, and advantages will be, or will become, apparent to one with skill in the art upon examination of the following figures and detailed description. All such additional systems, methods, features, and advantages are included within this description, are within the scope of the invention, and are protected by the following claims.

BRIEF DESCRIPTION OF THE DRAWINGS

The health and life sciences industry high-performance capability assessment model and system may be better understood with reference to the following drawings and description. The elements in the figures are not necessarily to scale, emphasis instead being placed upon illustrating the principles of the capability assessment techniques. In the figures, like-referenced numerals designate corresponding parts throughout the different views.

DETAILED DESCRIPTION OF THE PREFERRED EMBODIMENTS

Figure 1:
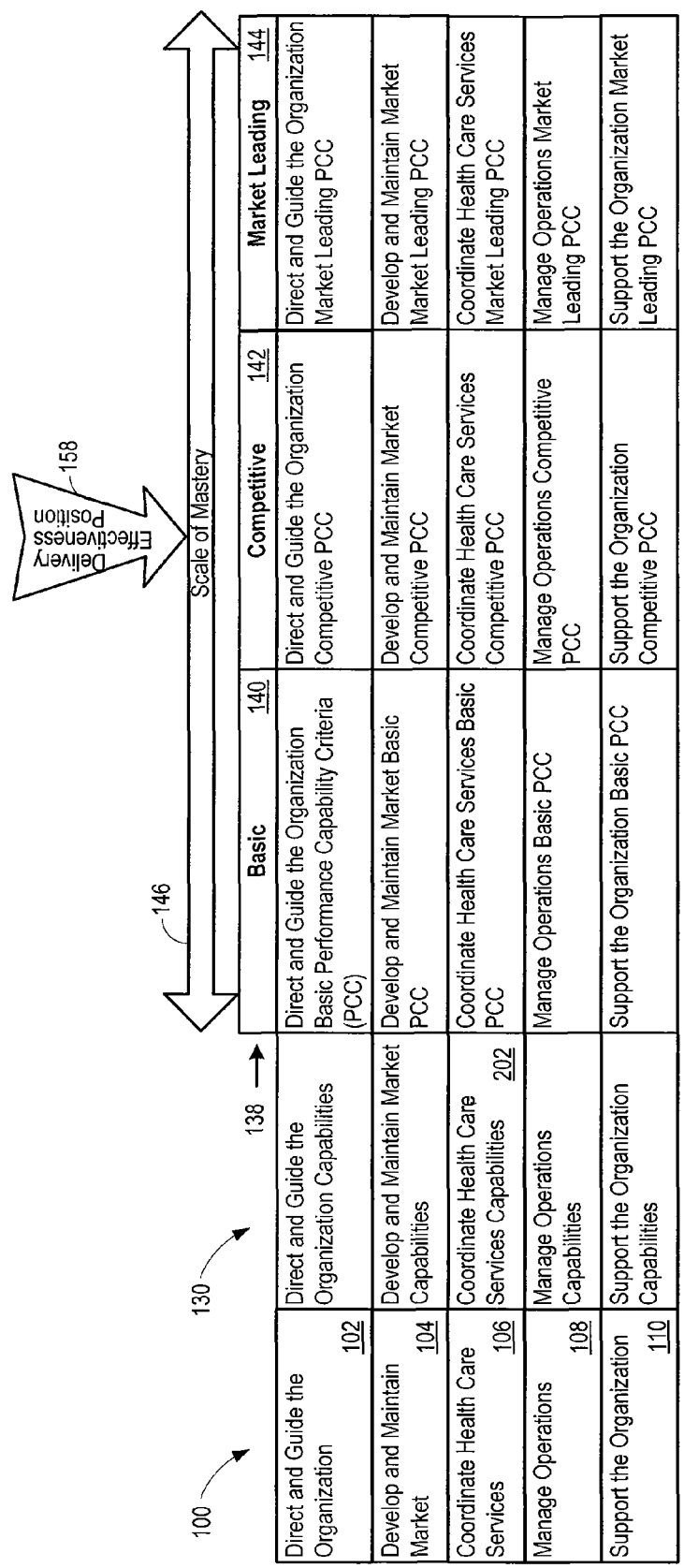
FIG. 1 shows a high-performance capability assessment model with a performance scale of mastery and performance criteria shown for different capabilities showing multiple platforms, including a direct and guide the organization platform, a develop and maintain market platform, a coordinate health care services platform, a manage operations platform, and a support the organization platform.

FIG. 1 shows a high-performance capability assessment (HPCA) model 100. The HPCA model 100 specifies five platforms, including a direct and guide the organization platform 102, a develop and maintain market platform 104, a coordinate health care services platform 106, a manage operations platform 108, and a support the organization platform 110. Each platform 102, 104, 106, 108 and 110 may include sub-platforms. The HPCA model 100 is not limited to the form shown in FIG. 1. Instead, the HPCA model 100 may be adapted and modified to fill a wide variety of analysis roles. Additional, different, or fewer platforms may be used in other implementations, with each platform defining additional, different, or fewer capabilities. Each platform and/or sub-platform includes one or more multiple <platform/sub-platform name> capabilities 130.

The HPCA model 100 establishes a multidimensional health and life sciences industry performance reference set that includes multiple key assessment performance levels 138, further described below in reference Tables 1-3. The performance levels 138 establish a scale of increasing effectiveness in delivery of each capability. The key assessment performance reference tables include a 'Basic' 140 delivery level, a 'Competitive' 142 delivery level and a 'Market Leading' 144 delivery level. The performance levels establish a scale of mastery 146 along which current business practices may be located and identified with respect to any platform and capability within a platform according to an analysis of performance capability criteria (PCC). The capability under evaluation may be assigned the performance level 138 based on a delivery effectiveness position 158 along the scale of mastery 146.

The 'Basic' delivery level 140 specifies 'Basic' performance assessment criteria, the 'Competitive' delivery level 142 specifies 'Competitive' performance assessment criteria, and the 'Market Leading' delivery level 144 specifies 'Market Leading' performance assessment criteria. The HPCA model 100 receives input data that specifies a health and life sciences business platform (e.g., a health and life sciences industry area) and a health and life sciences industry key assessment area for analysis. The HPCA model 100 searches the multidimensional health and life sciences industry performance reference set for a matching key assessment performance reference table that matches the health and life sciences industry platform and corresponding industry capability within the platform and the health and life sciences industry key assessment area, and retrieves the matching key assessment performance reference table. The HPCA model 100 initiates analysis of the matching key assessment performance reference table to obtain a resultant performance assessment level for the health and life sciences industry key assessment area.

Tables 1-3 below provide an explanation of each of the capability levels 140, 142, and 144.

TABLE 1

'Basic' Delivery Level

| | |
|---|---|
| Description: | Capability mastery at the basic level is competitive on a domestic or local level and selectively on a global basis. |

TABLE 2

'Competitive' Delivery Level

| | |
|---|---|
| Description: | Capability mastery at a competitive level is in the top 50% of performers when compared to domestic and international peer groups. |

TABLE 3

'Market Leading' Delivery Level

Description: Capability mastery at a market leading level implies that few companies globally are performing at this level, and can include emerging capabilities where companies have committed significant levels of investment and resources.

For FIGS. 2-9 the capability under evaluation may be assigned a level of mastery 138 based on the business' position along the scale of mastery 146 (e.g., the 'basic,' 'competitive,' or 'market leading' delivery level). Performance criteria corresponding to the basic 140, competitive 142, and market leading 144 performance levels populate the HPCA model 100. The performance criteria capture characteristics, and/or other features of the delivery of a capability at a particular performance level. Examples below illustrate performance criteria that provide analysis and benchmarking for health and life sciences organizations. The HPCA model 100 performance criteria provide a tool for determining where a platform and capability under examination falls along the scale of mastery 146.

For example, business consultants and business process engineers may interview a business or receive data about the business to determine, measure, or otherwise ascertain the characteristics, criteria, and other features of a particular capability implemented within the business. The consultants and engineers may compare the characteristics of the business to the performance criteria in the HPCA model 100 and arrive at an assessment level 138 for the capability under examination. In doing so, for example, the consultants and engineers may identify where the capability under examination falls in terms of the performance level for each key assessment area of a capability and determine an overall position on the scale of mastery 146 for the capability under examination. Performance criteria may populate the HPCA model 100 in whole or in part. Multiple high-performance capability assessments may be collected and stored with the performance criteria for future retrieval and possible modification in a capability detail pool, discussed below.

Figure 2:
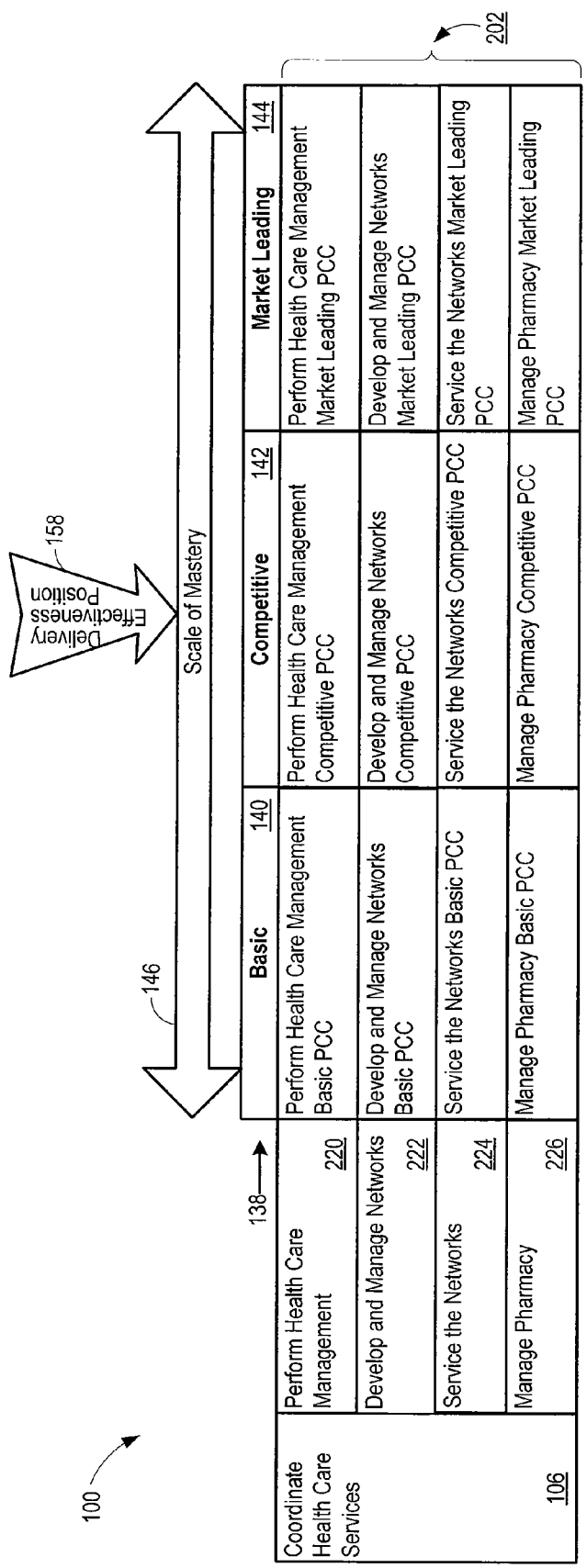
FIG. 2 shows a high-performance capability assessment model with capabilities for sub-platforms including a perform health care management sub-platform, a develop and manage networks sub-platform, a service the networks sub-platform, and a manage pharmacy sub-platform, all corresponding to the coordinate health care services platform.

FIG. 2 shows the coordinate health care services platform 106 divided into respective capability areas 202. The coordinate health care services platform 106 includes a perform health care management sub-platform 220, a develop and manage networks sub-platform 222, a service the networks sub-platform 224, and a manage pharmacy sub-platform 226.

Figure 3:
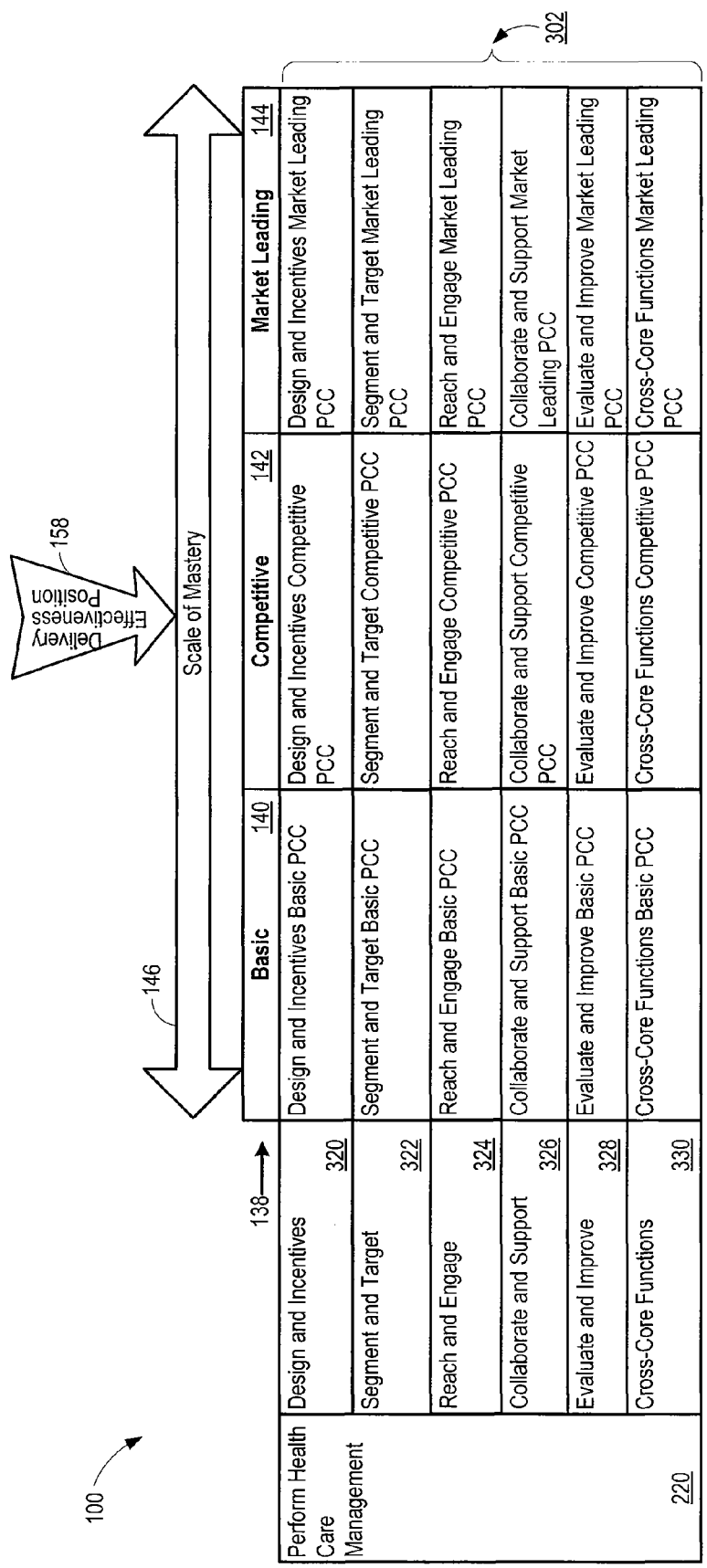
FIG. 3 shows a high-performance capability assessment model with capabilities for design and incentives, segment and target, reach and engage, collaborate and support, evaluate and improve, and cross-core functions, all corresponding to the perform health care management sub-platform.

FIG. 3 shows the perform health care management sub-platform 220 (corresponding to the coordinate health care services platform 106) divided into respective capability areas 302. The perform health care management sub-platform 220 includes a design and incentives capability 320, a segment and target capability 322, a reach and engage capability 324, a collaborate and support capability 326, an evaluate and improve capability 328, and a cross-core functions capability 330.

Figure 4:
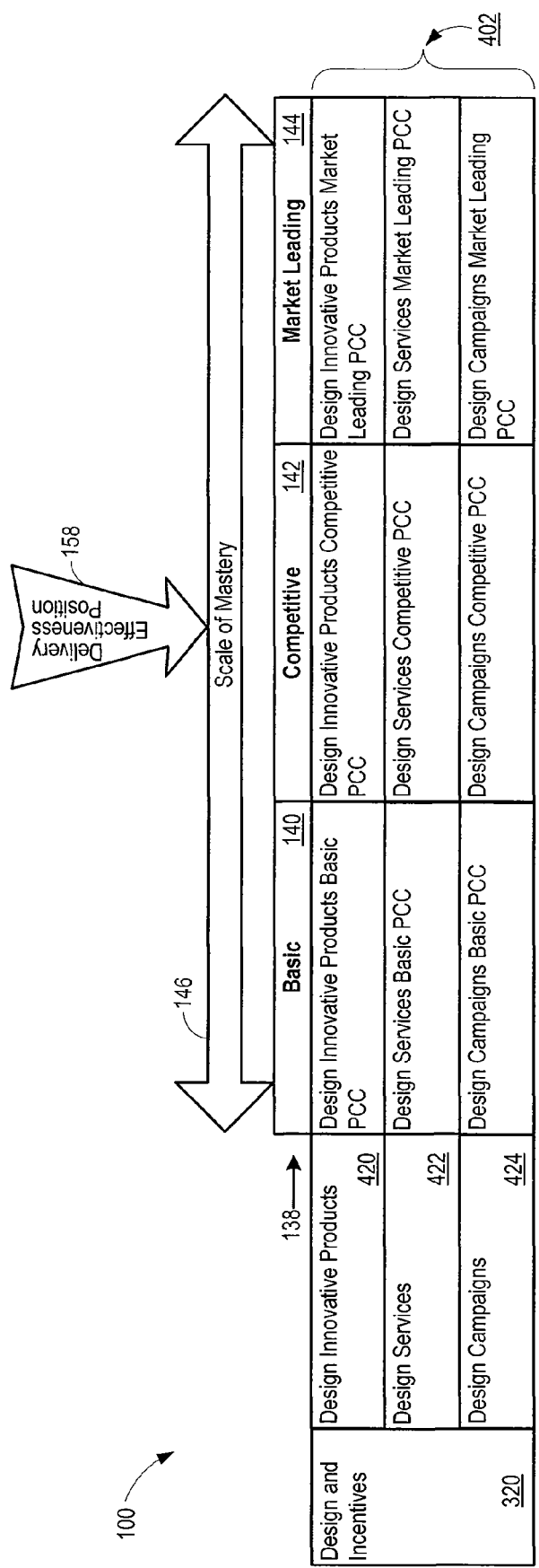
FIG. 4 shows a high-performance capability assessment model with further capabilities corresponding to design and incentives.

FIGS. 4-9 show the capabilities associated with the sub-platform entitled perform health care management 220. The capabilities associate with the develop and manage networks sub-platform 222, service the networks sub-platform 224, and manage pharmacy sub-platform 226 are not shown in this document. FIG. 4 shows further capabilities 402 including a design and innovative products capability 420, a design services capability 422, and a design campaigns capability 424.

Figure 5:
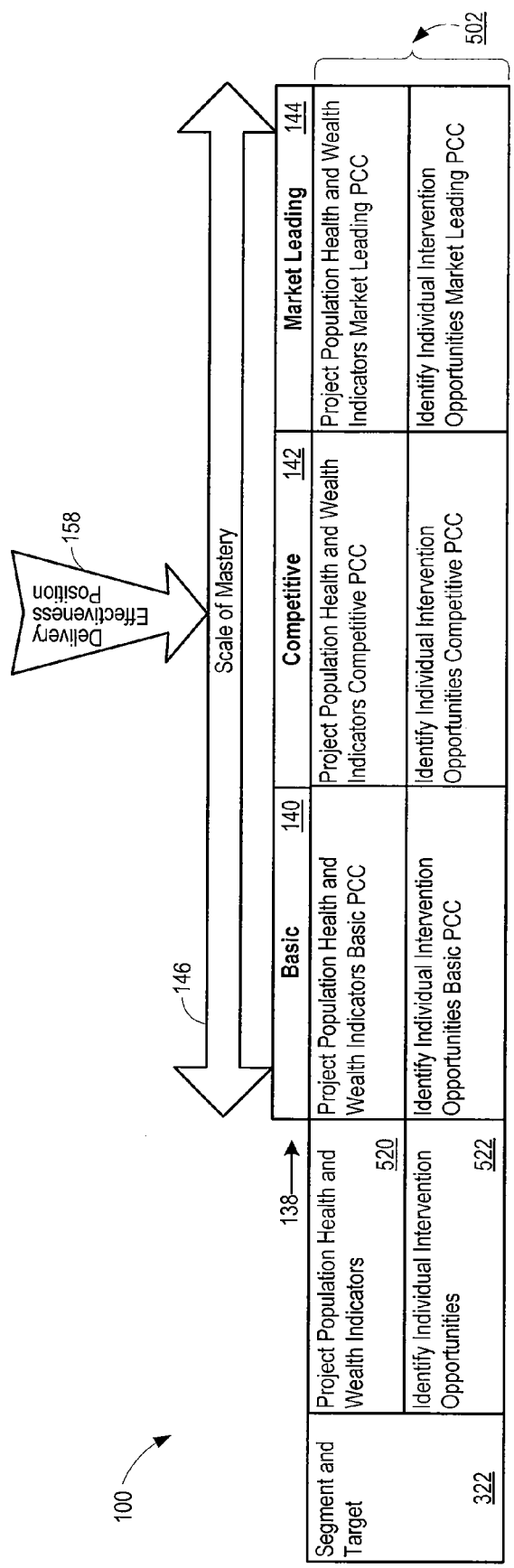
FIG. 5 shows a high-performance capability assessment model with further capabilities corresponding to segment and target.

FIG. 5 shows further capabilities 502 including a project population health and wealth indicators capability 520, and an identify individual intervention opportunities capability 522.

Figure 6:
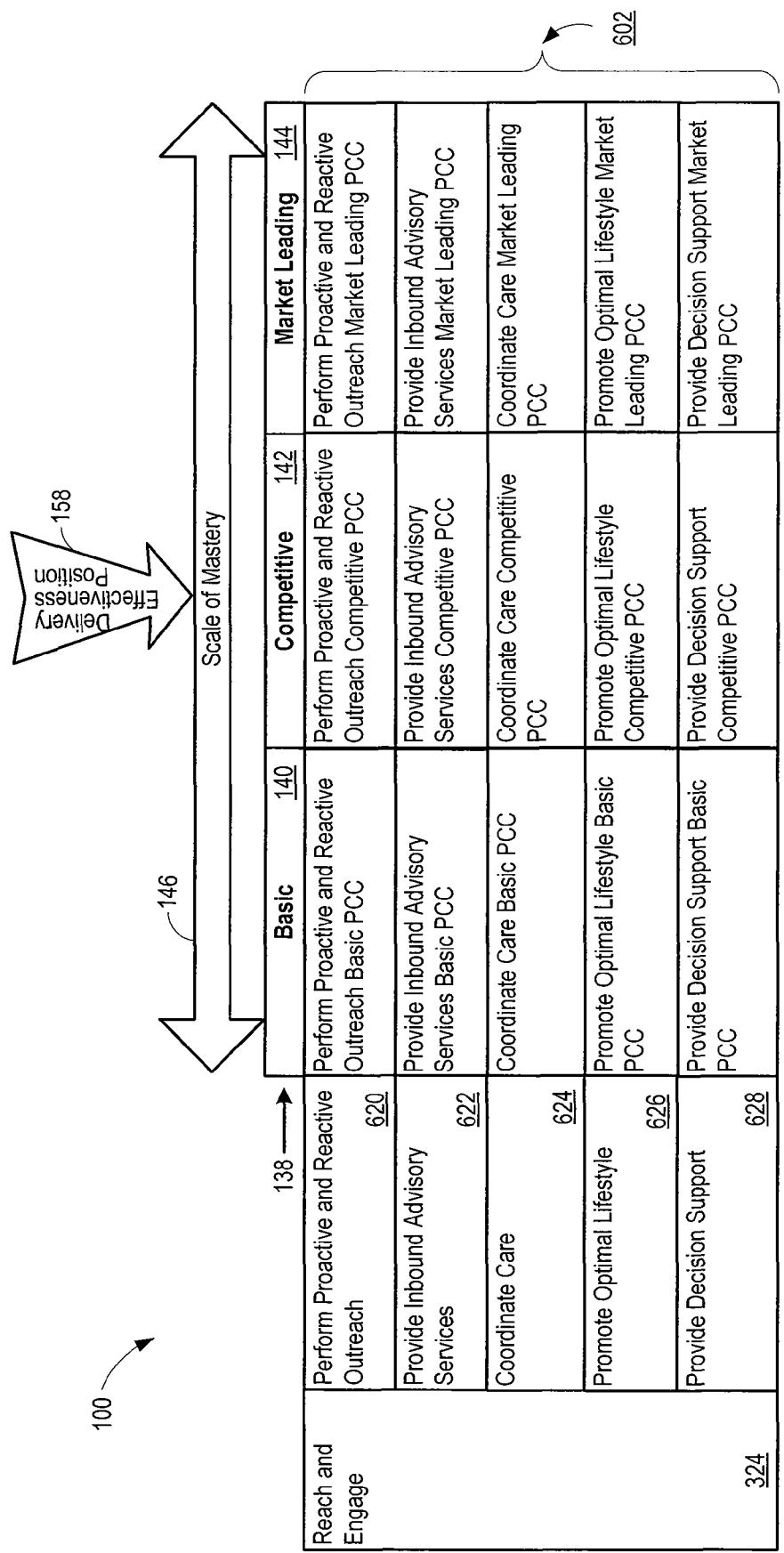
FIG. 6 shows a high-performance capability assessment model with further capabilities corresponding to reach and engage.

FIG. 6 shows further capabilities 602 including a perform proactive and reactive outreach capability 620, a provide inbound advisory services capability 622, a coordinate care capability 624, a promote optimal lifestyle capability 626, and a provide decision support capability 628.

Figure 7:
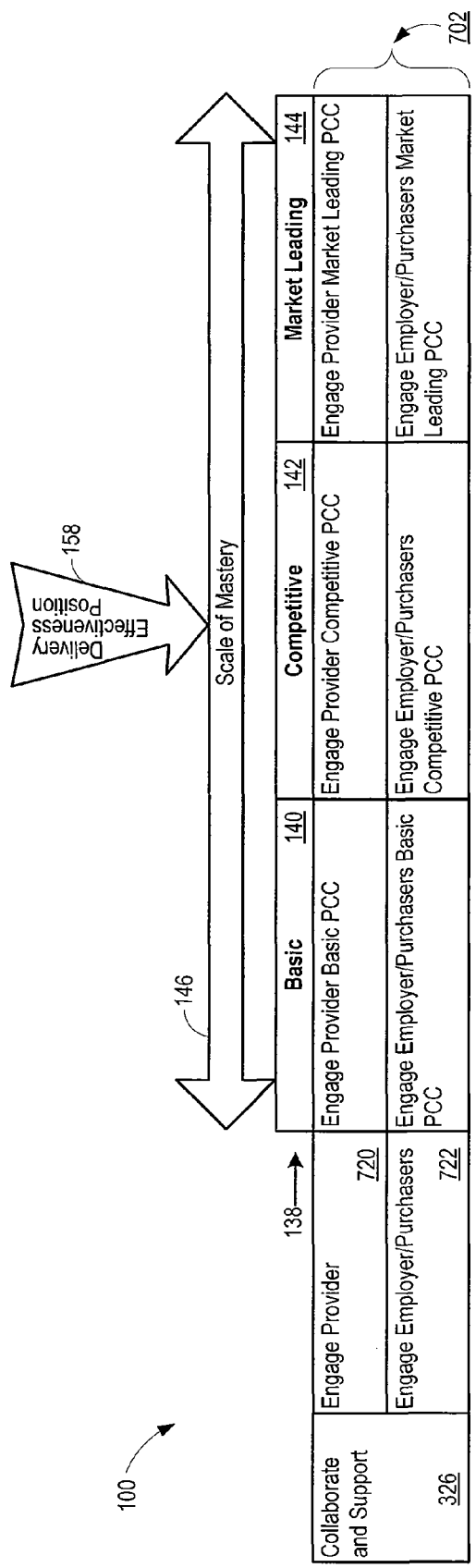
FIG. 7 shows a high-performance capability assessment model with further capabilities corresponding to collaborate and support.

FIG. 7 shows further capabilities 702 including an engage provider capability 720, and an engage employer/purchasers capability 722.

Figure 8:
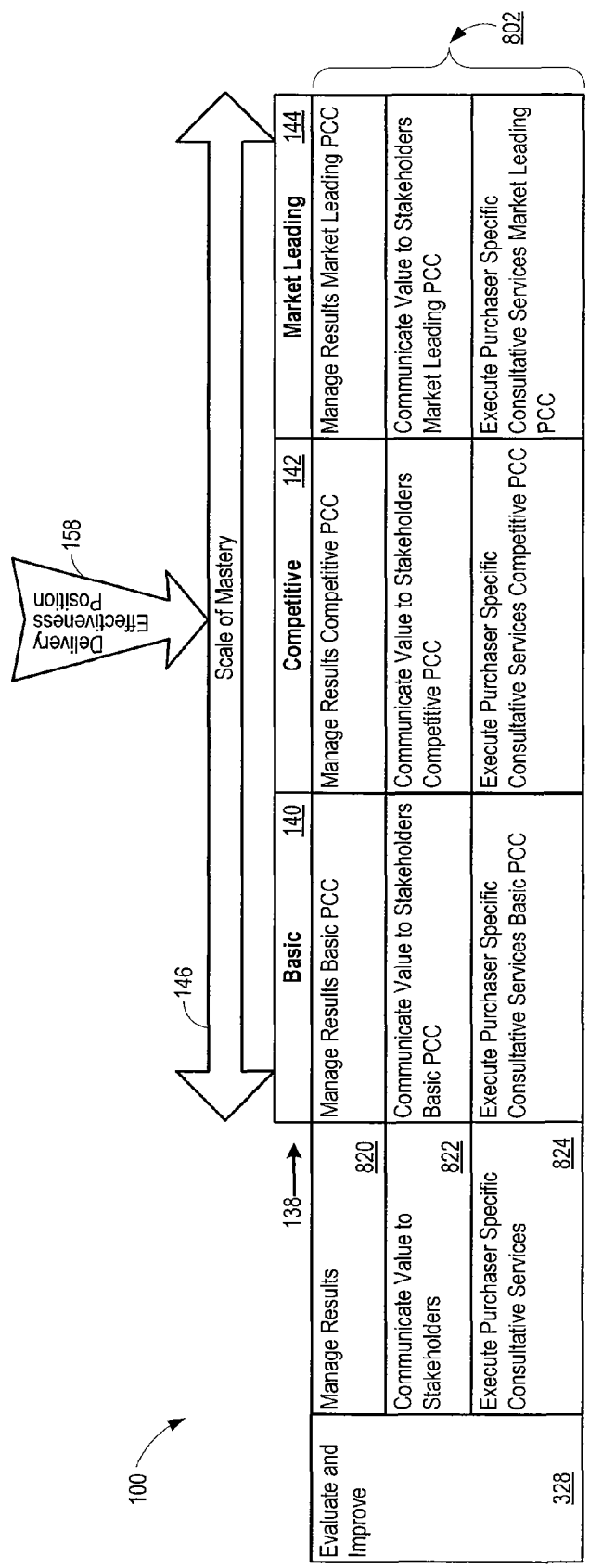
FIG. 8 shows a high-performance capability assessment model with further capabilities corresponding to evaluate and improve.

FIG. 8 shows further capabilities 802 including a manage results capability 820, a communicate value to stakeholders capability 822, and an execute purchaser specific consultative services capability 824.

Figure 9:
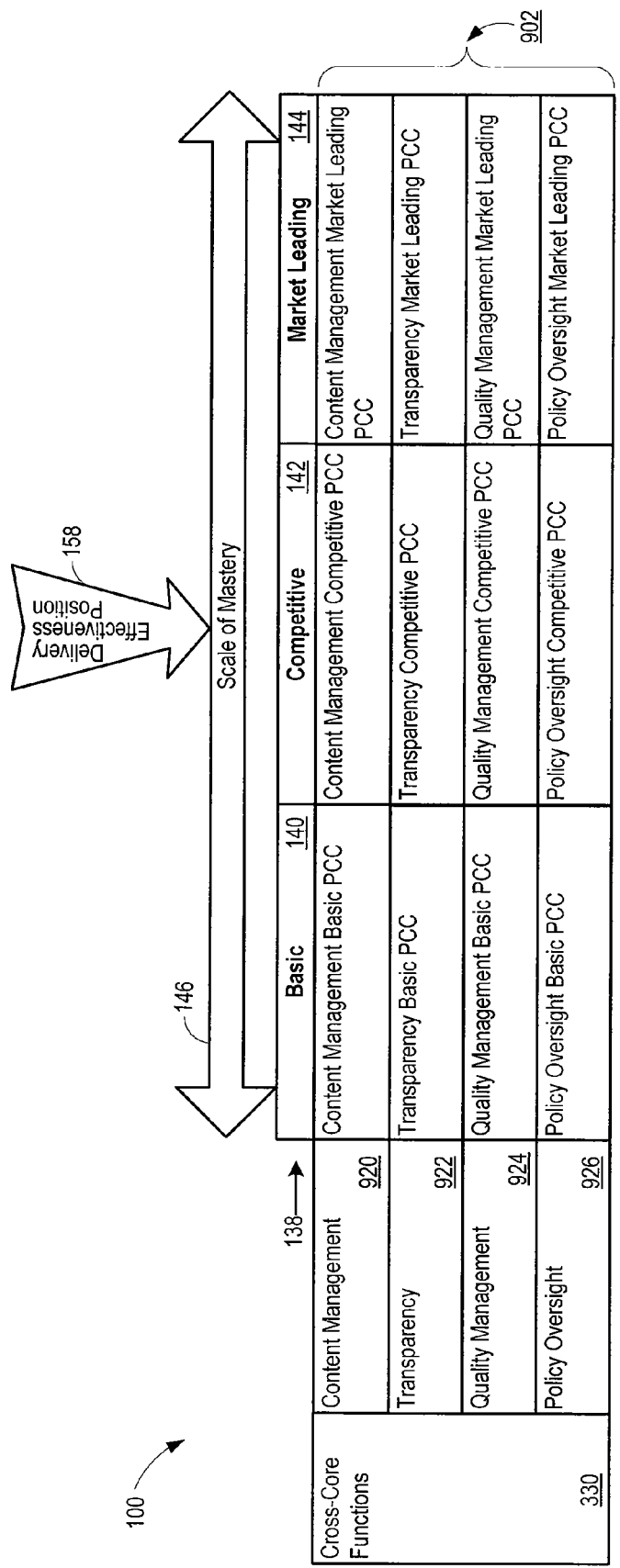
FIG. 9 shows a high-performance capability assessment model with further capabilities corresponding to cross-core functions.

FIG. 9 shows further capabilities 902 including a content management capability 920, a transparency capability 922, a quality management capability 924, and a policy oversight capability 926.

The tables provided in the appendix immediately following the abstract, which form part of this disclosure, provide an explanation of the capabilities and corresponding key assessment areas and performance criteria for some of the capabilities within the respective sub-platforms. Each capability may include one or more key assessment areas. Each key assessment area may include one or more additional key assessment areas. In other words, a business capability may include sub-capabilities, and therefore, key assessment areas corresponding to the multiple sub-capabilities. The tables in the appendix show specific criteria used to analyze each capability.

Figure 10:
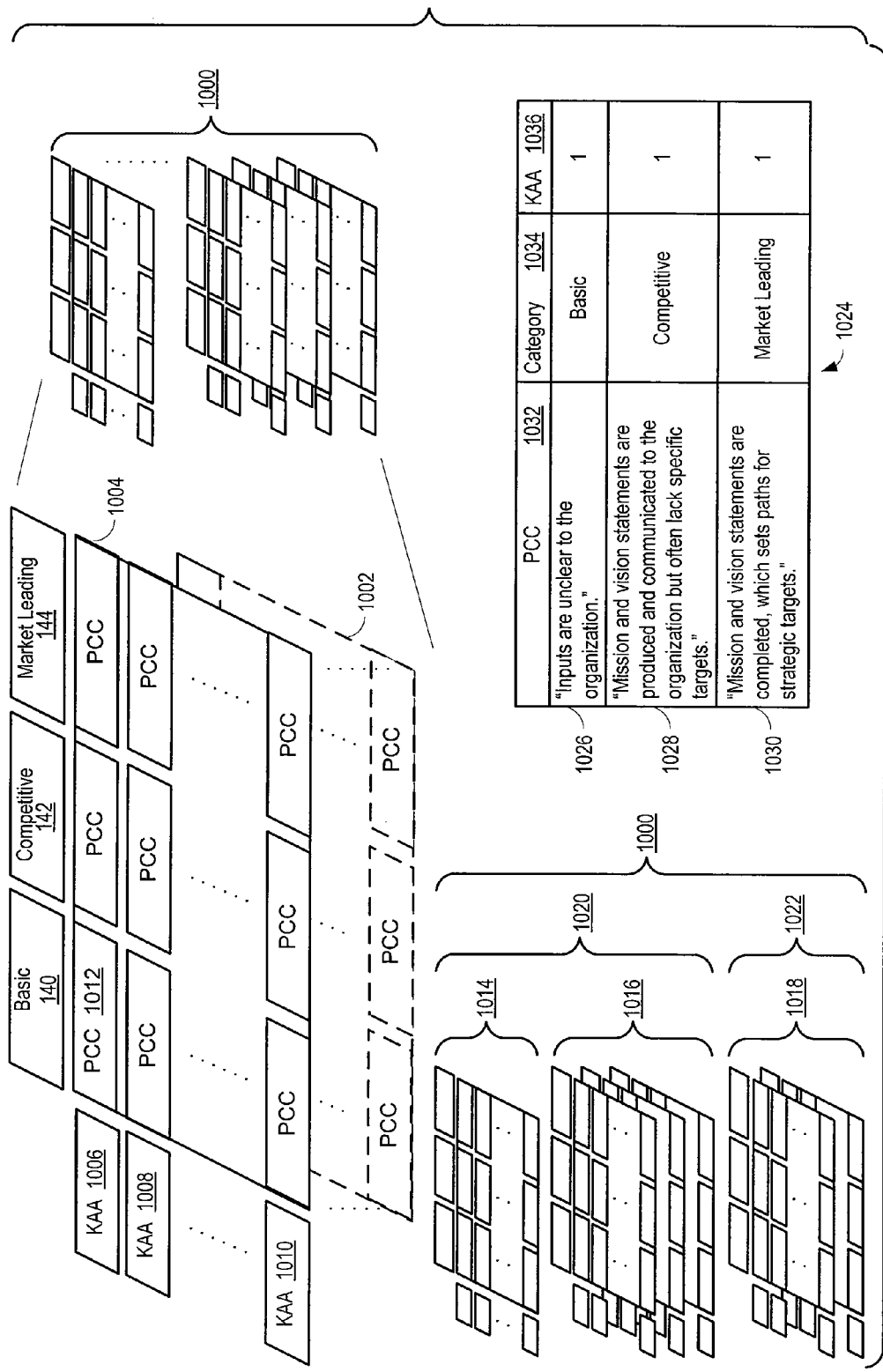
FIG. 10 shows a capability detail pool providing a multidimensional health and life sciences industry performance reference set where multiple key assessment performance reference tables are collected and stored.

FIG. 10 shows a multidimensional health and life sciences industry performance reference set 1000 ("reference set 1000") that provides a capability detail pool from which the system described below may obtain benchmarking tables for a health and life sciences business. The reference set 1000 includes multiple key assessment performance reference tables ("reference tables"), two of which are labeled 1002 and 1004. Each reference table may provide the benchmarking criteria for a specific capability, such as those noted above with respect to FIGS. 2-9.

One dimension of each table may establish the 'Basic' performance level 140 specifying 'Basic' performance assessment criteria, the 'Competitive' performance level 142 specifying 'Competitive' performance assessment criteria, and the 'Market Leading' performance level 144 specifying 'Market Leading' performance assessment criteria. Another dimension of each table may specify one or more key assessment areas (KAAs), several of which are labeled 1006, 1008, and 1010. As noted above, performance criteria, e.g., the PCC 1012, populates each key assessment performance reference table to provide benchmark criteria for 'Basic,' 'Competitive,' and 'Market Leading' characteristics.

The reference set 1000 represents the HPCA model 100. Consistent with the HPCA model 100, the reference set 1000 may organize multiple reference tables into a hierarchical structure defining discrete changes in granularity. In one implementation, the hierarchical structure includes reference tables, high-level platforms, platforms, sub-platforms, and models. FIG. 10 labels three sub-platforms 1014, 1016, and 1018. The reference set 1000 may further organize the platforms, two of which are labeled 1020 and 1022. Platforms aggregate into the HPCA model 100 and corresponding reference set 1000. Additional, different, or fewer levels of granularity may be defined in the HPCA model 100.

The reference set 1000 may dynamically populate the reference tables with the most up-to-date performance criteria, for example upon retrieval and presentation by a business analysis consultant. The performance criteria may be retrieved from a performance capability criteria database or other information source.

FIG. 10 also shows an example of a database implementation 1024 of a portion of a reference table. In particular, the database implementation 1024 includes records (e.g., the records 1026, 1028, 1030) that establish each PCC 1012. In the example shown, each record includes a PCC field 1032, a category specifier field 1034, and a KAA specifier field 1036. Other fields may be provided, such as a reference table assignment field or reference set assignment field. The records categorize each PCC into a specific category (e.g., 'Basic'), into a specific KAA, and, optionally, into a specific reference table in a specific reference set for any particular HPCA model.

Figure 11:
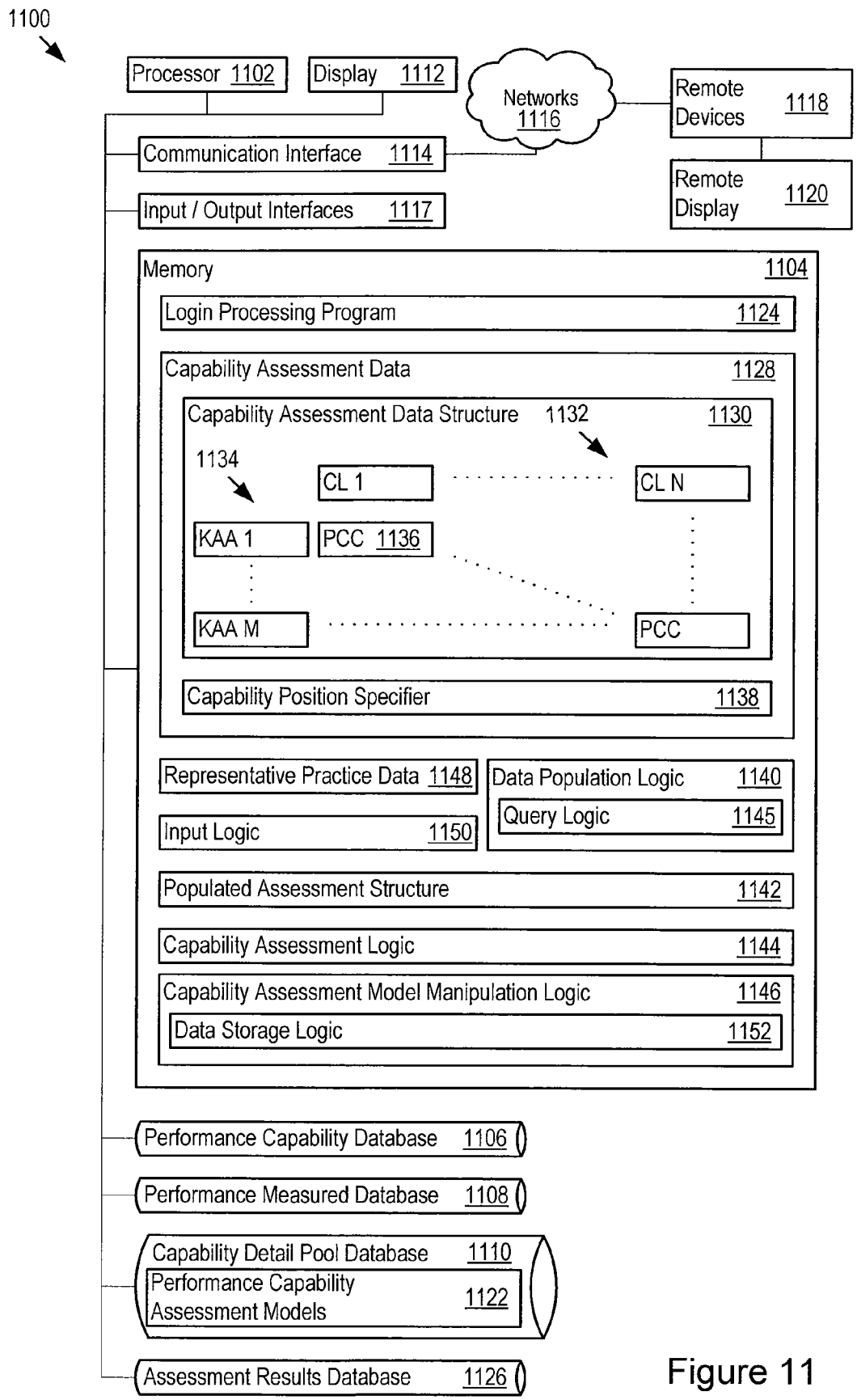
FIG. 11 shows a capability assessment system.

FIG. 11 shows a high-performance capability assessment system ("system") 1100. The system 1100 includes a processor 1102 and a memory 1104. Several databases support the operation of the system 1100, including a performance capability database 1106, a performance measured database 1108, a capability detail pool database 1110, and an assessment results database 1126. The system 1100 may include a local display 1112 and input/output interfaces 1117 (e.g., including a keyboard, mouse, microphone, speakers, or other device), and, through the communication interface 1114 and networks 1116, may communicate with remote devices 1118 and remote displays 1120. The networks 1116 may be any combination of external networks (e.g., the Internet) and internal networks (e.g., corporate LANs). The displays 1112 and 1120 may, for example, present performance capability assessment models 1122 that the system 1100 retrieves from the capability detail pool database 1110 for review, modification, and application by process engineers or other individuals. With regard to local access or access by the remote devices 1118, the system 1100 may include a login processing program 1124 to authenticate and/or authorize access to the system 1100. To that end, the login processing program 1124 may include username/password verification, private/public key encryption, or other validation and data protection capabilities.

In one implementation, the capability performance database 1106 stores performance criteria. As will be described in more detail below, the system 1100 may populate performance capability assessment models with performance capability criteria suited to any particular platform or sub-platform (e.g., a perform health care management sub-platform 220), and business capability at one or more capability levels across one or more key assessment areas. The performance measured database 1108 may store the determined, measured, or otherwise ascertained characteristics, criteria, and other measured data of a particular key assessment area as representative practice data 1148. The representative practice data 1148 may be obtained through interviews with business consultants and industrial engineers, through online questionnaires, through manual or automated analysis of business data (e.g., year-end operating reports), or in other manners. The capability detail pool database 1110 stores the capability detail pool 1000, which includes pre-defined performance capability assessment models 1122. The assessment results database 1126 stores determined capability levels for specific capabilities that have been analyzed.

The system 1100 facilitates the review, modification, creation, and application of performance capability assessment models. In that role, performance capability assessment model manipulation logic ("manipulation logic") 1146 within the system 1100 creates, retrieves, and stores capability assessment data 1128 in the memory 1104. The manipulation logic 1146 may establish capability assessment data 1128 in the memory 1104, including a capability assessment data structure 1130 with multiple capability levels ("CL") 1132 organized along a scale of mastery dimension, multiple key assessment areas ("KAA") 1134 organized along a key factor dimension, and performance criteria ("PCC") 1136 that populates the performance capability assessment model 1130. The manipulation logic 1146 may vary widely in implementation, and, as one example, may include data storage logic 1152 that saves data in memory and user interface logic that accepts capability level specifications, key assessment area specifications, and performance capability criteria inputs to create new performance capability assessment models, to modify existing performance capability assessment models, to delete performance capability assessment models, or to retrieve performance capability assessment models for review.

In one implementation, the manipulation logic 1146 establishes the capability assessment data structure 1130 to include a multidimensional health and life sciences industry performance reference set that includes multiple key assessment performance reference tables in which the key assessment performance reference tables include a 'Basic' capability performance level, a 'Competitive' capability performance level, and a 'Market Leading' capability performance level.

The capability assessment data 1128 may also include a capability position specifier 1138. The capability position specifier 1138 may record the capability level along the scale of mastery 146, as determined for any particular capability. Thus, the system 1100 may store the performance level in the assessment results database 1126 or elsewhere for future retrieval and review.

In one implementation, the data population logic 1140 may be a data population program executed by the processor 1102 that populates template performance capability assessment models. For example, the data population logic 1140 may include input logic 1150 that accepts input specifying a capability of interest that indicates a particular performance capability assessment model. The data population logic 1140 may include query logic 1145 that executes database queries and prompts a user for input to obtain the corresponding performance capability criteria for the capability of interest.

In another implementation, for example, the query logic 1145 may receive an input specifying a health and life sciences industry area and a health and life sciences industry key assessment area with the health and life sciences industry area for analysis. The query logic 1145 searches the multidimensional health and life sciences industry performance reference set for a matching key assessment performance reference table that matches the health and life sciences industry area and the health and life sciences industry key assessment area, and retrieves the matching key assessment performance reference table.

The data population logic 1140 may further include storage logic that adds the retrieved performance capability criteria to the template performance capability assessment model. The data population logic 1140 produces populated performance capability assessment structures 1142 that may be stored in the capability detail pool database 1110.

In addition to the analysis process described above, the system 1100 may provide an automated analysis of representative practice data 1148 that identifies relevant performance capability criteria and determines the position on the scale of mastery 146 of each key assessment area corresponding to the performance capability criteria for the representative practice data 1148. As one example, the system 1100 may implement capability assessment logic 1144 that includes comparison and/or matching logic that analyzes the representative practice data 1148 with respect to performance capability criteria to locate key assessment areas for which the system 1100 can determine capability levels to obtain a resultant performance level for each key assessment area.

Furthermore, the capability assessment logic 1144 may determine an overall position on the scale of mastery 146 as the capability position specifier 1138 for a capability under examination given the knowledge of where the key assessment areas corresponding to the capability under examination fall in each capability level. Thus, for example, the capability assessment logic 1144 may determine an overall capability level for a capability corresponding to the capability level for the majority of the key assessment areas, or it may apply a weighted analysis technique to give more emphasis to some key assessment areas than others in determining the overall position on the scale of mastery 146 for a capability. As another example, the capability assessment logic 1144 may implement an expert system (e.g., based on a neural network trained on prior determinations) that analyzes the determined characteristics with respect to the performance capability criteria and ascertains where the capability under examination falls along the scale of mastery 146 for each of the key assessment areas, or overall on the scale of mastery.

Figure 12:
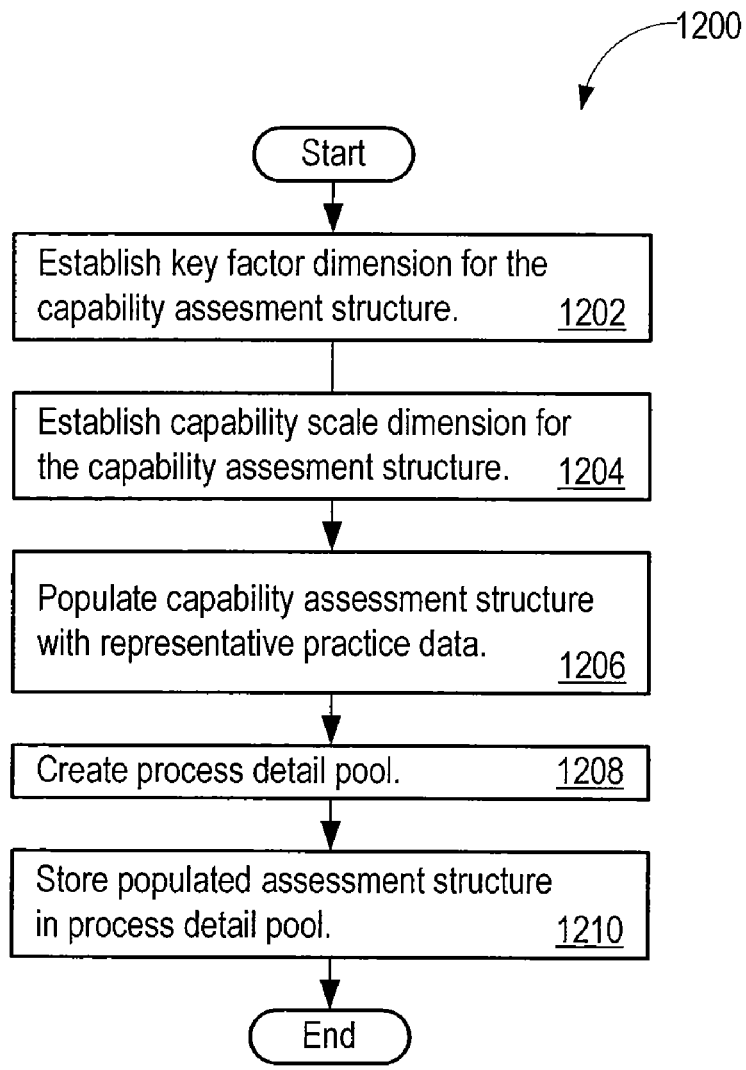
FIG. 12 shows a flow diagram for establishing high-performance capability assessment models.

FIG. 12 shows a flow diagram 1200 for creating performance capability assessment models. The performance capability assessment model creator (e.g., the manipulation logic 1146) establishes a key factor dimension for the performance capability assessment model (1202). The performance capability assessment model creator also establishes a capability scale dimension for the performance capability assessment model (1204). The capability scale dimension may define a scale of increasing organizational capability. For example, the structure creator may create the 'Basic' level 140, the 'Competitive' level 142, and the 'Market Leading' level 144. The performance capability assessment model creator also populates the performance capability assessment model with capability performance criteria (1206). A capability detail pool 1000 may be formed to hold multiple tailored key assessment performance reference tables (1208). The performance capability assessment model creator may store the populated assessment structure in the capability detail pool for subsequent retrieval and analysis (1210).

Figure 13:
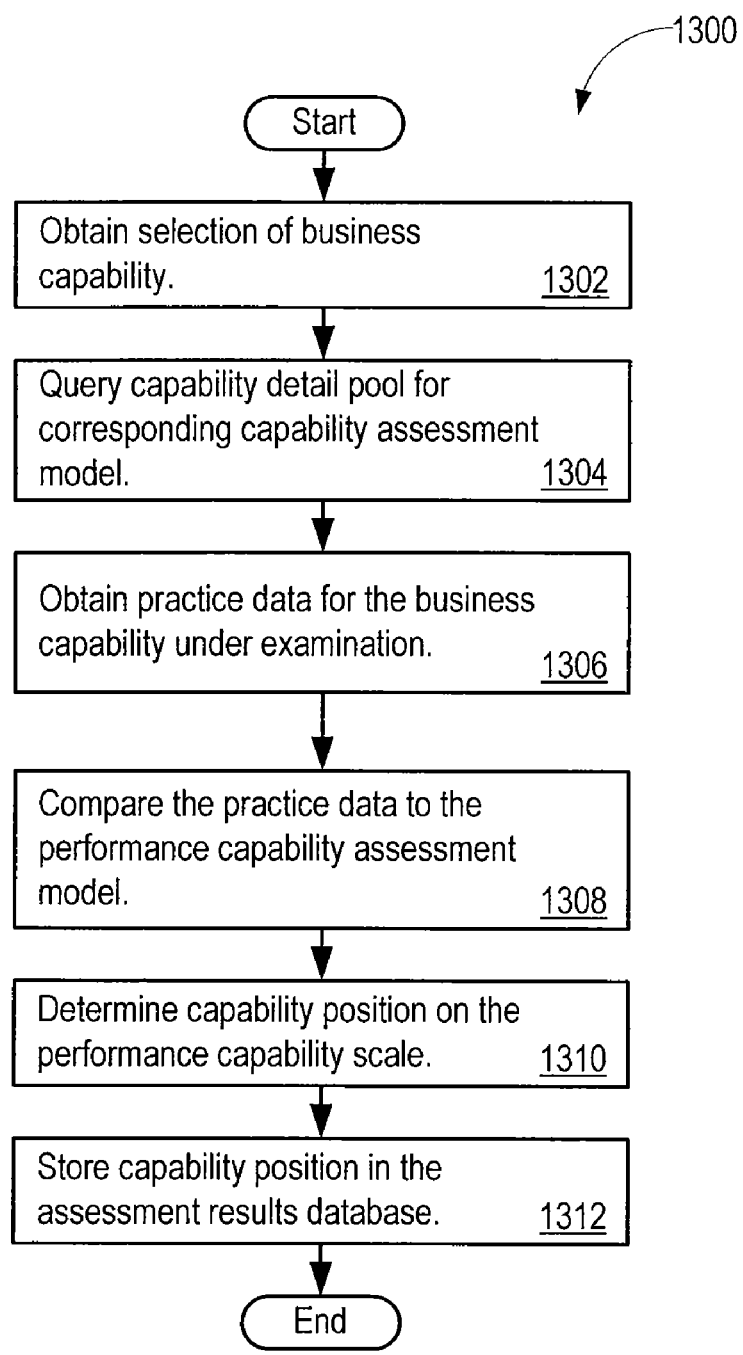
FIG. 13 shows a flow diagram for retrieving and applying high-performance capability assessment models.

FIG. 13 shows a flow diagram 1300 for retrieving and applying performance capability assessment models. A selection of a capability to be analyzed is obtained (1302). In one implementation, the system 1100 receives input data that specifies a health and life sciences industry area and a health and life sciences industry key assessment area for analysis. For example, the system 1100 may accept input from a business consultant that specifies a capability for analysis. The system 1100 may query the capability detail pool 1000 for a corresponding performance capability assessment model (1304). The corresponding performance capability assessment model may be pre-defined in the capability detail pool 1000, or the data population logic 1140 (or other actor) may populate a performance capability assessment model template that the system 1100 newly creates, or that the system 1100 retrieves from a data store, such as the capability detail pool database 1110.

In another example, the system 1100 searches the multidimensional health and life sciences industry performance reference set in the capability detail pool 1000 for a matching key assessment performance reference table based on the input data that specifies a health and life sciences industry platform and a health and life sciences industry key assessment area. The system 1100 retrieves the matching key assessment performance reference table and initiates analysis of the matching key assessment performance reference table to obtain a resultant performance level for the health and life sciences industry key assessment area.

The system 1100 obtains representative practice data 1148 for the capability under examination in the specific business under review (1306). For example, a business consultant may interview the business to determine how the business currently executes the capability under review. As another example, a representative from the business may complete a questionnaire, submit business data for analysis and parameter extraction, or otherwise provide the characteristics of their current capability execution. As a further example, the system 1100 may retrieve the representative practice data 1148 from a database of previously obtained representative practice data.

The system 1100 compares the representative practice data 1148 to the performance criteria in the performance capability assessment model (1308). For example, a business consultant may use his or her expertise to arrive at a determination of level for the business and the capability under examination (1310). Alternatively or additionally, the capability assessment logic 1144 may perform an automated analysis of the assessment results data in the assessment results database 1126 and ascertain the performance level on the scale of mastery 146. The system 1100 may store the assessment results, including the determined performance level, for future reference in the assessment results database 1126 or other location (1312).

Figure 14:
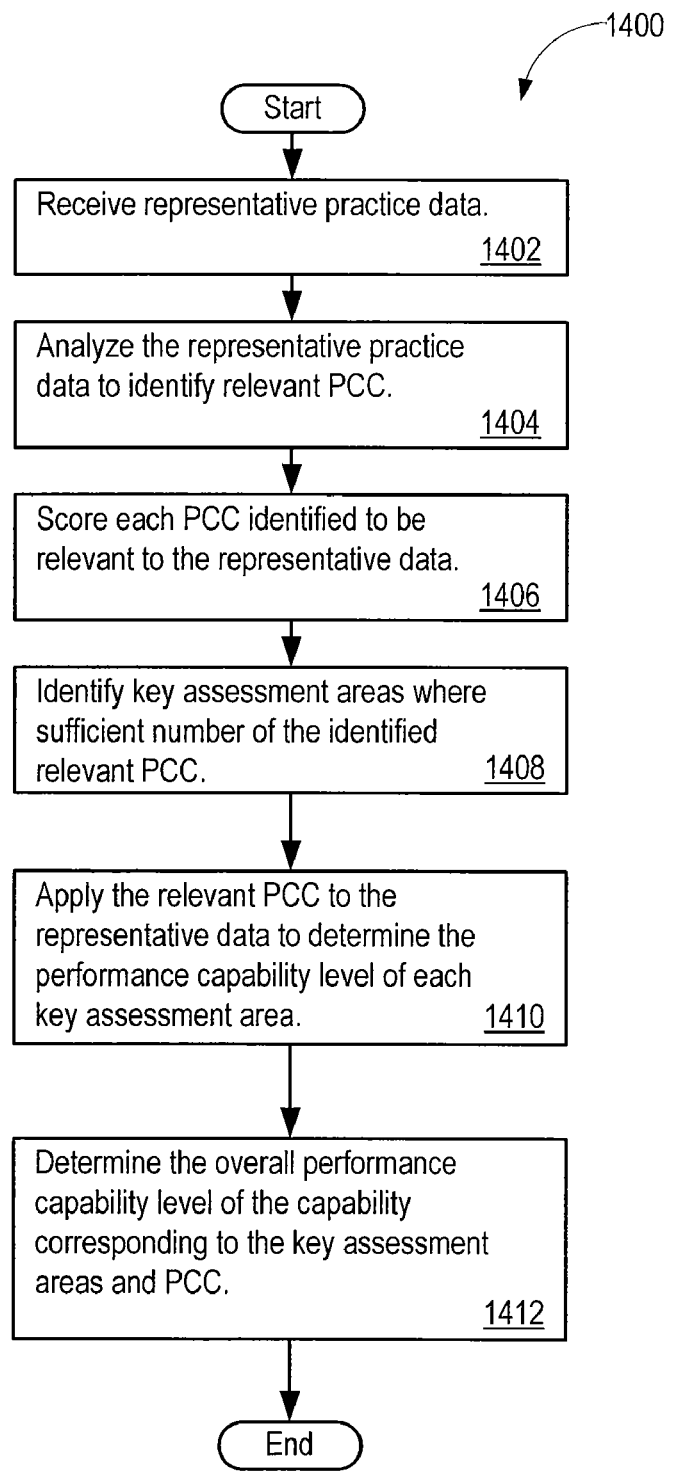
FIG. 14 shows a flow diagram for analyzing representative practice data to determine a health and life sciences industry and a health and life sciences key assessment area to which the representative practice data applies.

FIG. 14 shows a flow diagram 1400 for analyzing representative practice data 1148 to determine a health and life sciences industry and a health and life sciences key assessment area to which the representative practice data applies. The system 1100 receives representative practice data 1148 as input data (1402). The system 1100 may receive the representative practice data 1148 from a database query performed by the query logic 1145 that the query logic executes periodically, when instructed by an operator, and/or automatically against any number of available database sources that store representative practice data 1148. The capability assessment logic 1144 analyzes the representative practice data 1148 to identify performance capability criteria in the capability detail pool 1000 that the capability assessment logic 1144 determines relevant to the representative practice data 1148 (1404). For example, the capability assessment logic 1144 may compare and/or match the content of the representative practice data 1148 with the performance capability criteria using natural language processing (NLP), text string, and/or substring matching, by comparing tags linked to the representative practice data 1148 and that specify that any portion of the representative practice data 1148 is applicable to a specific PCC, by querying for a manual classification of the representative practice data 1148 to a PCC, or other matching technique. The capability assessment logic 1144 may score and/or weight a performance capability criteria and compare the score and/or weight to a user specified relevance threshold to rank the relevance of the performance capability criteria to the representative practice data 1148 (1406). The user may specify particular terms and/or phrases to search and match between the performance capability criteria and the representative practice data 1148, in order to score the performance capability criteria.

The capability assessment logic 1144 may determine, based on the number of performance capability criteria that meet or exceed the relevance threshold, that the capability assessment logic 1144 has identified a sufficient number of performance capability criteria for a specific key assessment area in order to determine a performance level for the capability as a whole or any key assessment area within the capability (1408). As one example, where at least 51% of the performance capability criteria for a particular key assessment area meet or exceed the relevance threshold, the capability assessment logic 1144 applies the performance capability criteria to the representative practice data 1148. In another example, the performance capability criteria for a particular key assessment area may be ranked in importance and/or designated as mandatory in order to assess the key assessment area. In the event the capability assessment logic 1144 identifies the mandatory performance capability criteria for a key assessment area, the capability assessment logic 1144 applies the performance capability criteria to the representative practice data 1148.

The capability assessment logic 1144 may apply the performance capability criteria meeting or exceeding the relevance threshold to the representative practice data 1148 to determine whether any particular PCC is met. Accordingly, as the capability assessment logic 1144 analyzes the PCC, the system 1100 tracks the best fit of the representative practice data 1148 to the PCCs in the key assessment performance reference tables. In other words, the system 1100 determines how the representative practice data 1148 meets (or does not meet) each PCC, thereby gaining insight into whether the representative practice data 1148 is indicative of 'Basic,' 'Competitive,' or 'Market Leading' practices.

The system 1100 may also gauge the position on the scale of mastery 146 of each key assessment area corresponding to the performance capability criteria (1410). The capability assessment logic 1144 may further determine an overall position on the scale of mastery 146 for a capability (1412). The capability assessment logic 1144 may establish that a desired number and/or designated mandatory performance capability criteria for the key assessment areas have been identified as relevant to a capability and sufficient to determine the position on the scale of mastery 146 for the capability. For example, the capability assessment logic 1144 may determine an overall performance level for the capability based on the performance level determined for the majority of the key assessment areas. The capability assessment logic 1144 may apply a weighted analysis technique to give more emphasis to some key assessment areas than others in determining the overall position on the scale of mastery 146 for the capability. Although selected aspects, features, or components of the implementations are depicted as being stored in computer-readable memories (e.g., as computer-executable instructions or performance capability assessment models), all or part of the systems and structures may be stored on, distributed across, or read from other computer-readable media. The computer-readable media may include, for example, secondary storage devices such as hard disks, floppy disks, and CD-ROMs; a signal, such as a signal received from a network or received at an antenna; or other forms of memory, including ROM or RAM, either currently known or later developed.

Various implementations of the system 1100 may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be combined or split among multiple programs, or distributed across several memories and processors.

The HPCA 100 model provides unexpectedly good results for a performance capability assessment model, particularly in the health and life sciences industry. In particular, the combinations of key assessment areas and particular assessment criteria of the HPCA model, including the criteria noted in the Appendix of Tables, provide significant advantages over other assessment models. The unexpectedly good results include clearly identifying and delineating from among multiple related complex processes the specific processes to improve, how to improve the process, and identifying concrete and measurable improvement goals.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

APPENDIX OF TABLES

TABLE 1

Capability Assessment Model
Payer - Coordinate Healthcare Services
Design Innovative Products

| Sub-Platform: Perform Health Management | | Capability: Design and Incent |
|---|---|---|
| Basic | Competitive | Market Leading |
| Medical product design at group and subscriber level provides preventive service coverage for minimal out-of-pocket cost | Medical product design at group and subscriber level includes high deductible health plan options and provides preventive service coverage | Medical, pharmacy, and wellness product design includes dynamic consumer-level benefits and market segmented benefits Service design includes strategies to engage consumers and measure effectiveness |
| Pharmacy product design channels use of mail-order and appropriate benefit tiers | Pharmacy product design supports mail-order, generic drug incentives (e.g. coupons, reward points, co-paying waiving, etc.), and specialty pharmacy | More robust incentives offered: Aligned incentives to medication adherence |
| When applicable medical and/or pharmacy product is supported by a type of health spending account | | More robust incentives offered: Consumer selected incentives |
| Traditional Utilization Management is an optional feature | Product design includes wellness components with minimal healthy lifestyle incentives | More robust incentives offered: Increased incentives for healthy lifestyle |
| Traditional, episodic Case Management | | |
| Disease Management offered for defined list of conditions | Product features include access to Affinity networks and product discounts | More robust incentives offered: Incentives aligned to disease condition goals |
| Inconsistent and fragmented sourcing strategy | Products are supported by tax advantaged spending accounts, when applicable | More robust incentives offered: Incentive/reward tracker tools |

TABLE 1-continued

Capability Assessment Model
Payer - Coordinate Healthcare Services
Design Innovative Products Sub-Platform: Perform Health Management — Capability: Design and Incent

| Basic | Competitive | Market Leading |
|---|---|---|
| Product design and pricing driven by Sales and Marketing team(s) | Ease of administration of health spending accounts includes batch cross-over payment Tiered products for Case Management and Disease Management based on intensity Majority of programs and services are insourced providing a more integrated experience. Limited outsourced services with continued fragmentation Collaborative product design and pricing effort between Sales, Marketing, and Health Management | Tiered products for wellness based on intensity Expansion of services offered within Affinity networks and product discounts (e.g. spa services, chiropractic, acupuncture, etc.) Option to buy-up concierge services Ease of administration of health spending accounts includes real time cross-over payment Investment and credit products supporting spending accounts and high-deductible product design Minimal outsourcing, when necessary, with high degree of integration Pricing completed using sophisticated models that have been market tested Pricing based on lifestyles, accurate staffing models, dynamic premium pricing Health Management continually introduces differentiating product design as part of market dynamics and the consultative sales process driven by analytics |

TABLE 2

Capability Assessment Model
Payer - Coordinate Healthcare Services
Design Services Sub-Platform: Perform Health Management — Capability: Design and Incent

| Basic | Competitive | Market Leading |
|---|---|---|
| Focus on episodic and chronic segments of health care continuum Core traditional Health Management services driven by the purchasers (i.e. UM, CM, DM) Standard services across all market segments Static assessments and scripting Condition oriented services Metrics tied to operational processes Segmented service units that support specific functions | Focus on healthy, at risk, episodic, and chronic segments of health care continuum Services evolving to integrated health advocate model Market segment specific services (e.g. senior segment, etc.) Dynamic assessments and scripting Whole person oriented services Metrics tied to health and financial outcomes Coordinated services with some consolidation of service units | Focus across entire health care continuum Integrated service model, which includes all consumer and provider facing services Personalized assessments and scripting which include consumer engagement approaches Proactive anticipation of consumer needs Actionable high performance metrics tied to results with defined accountabilities and action plans Integrated service units |

TABLE 3

Capability Assessment Model
Payer - Coordinate Healthcare Services
Design Campaigns Sub-Platform: Perform Health Management — Capability: Design and Incent

| Basic | Competitive | Market Leading |
|---|---|---|
| Population based campaigns targeted to specific conditions or disease states Limited metrics defined to measure impact and value of campaign Campaign channels limited to mail or phone Condition based content | Timely population based campaigns tailored to specific segments Purchaser driven campaign identification and design Specific metrics defined to measure impact and value of campaigns Addition of web-based channels (e.g. portal, email, etc.) for campaign outreach and content distribution Use of a campaign management solution Prevention, condition, and segment based content | Personalized campaigns targeted to individual opportunities and preferences during optimal impact period Segment specific outreach channels (e.g. satellite radio, magazine, online TV, etc.) Personalized and consumer preferred channels for outreach Specific metrics defined to measure impact and value of campaigns Integrated campaign management solution for enterprise Personalized, prevention, condition, and segment based content |

TABLE 4

Capability Assessment Model
Payer - Coordinate Healthcare Services
Project Population Health and Wealth Indicators Sub-Platform: Perform Health Management     Capability: Segment and Target

| Basic | Competitive | Market Leading |
|---|---|---|
| Identify consumers based on defined criteria, historical data, and available reports | Leverage multiple traditional data sources (e.g. claims, health assessment, etc.) and basic analytics to segment consumer population<br>Integrates data sources into single, unified view across Health Management functions<br>Population based financial and clinical impacts are incorporated into segmentation and algorithms<br>Dedicated team that systematically reviews segmentation and algorithms to identify and implement improvements | Utilize data from varying data sources to segment consumer population and design and execute trajectory predictors<br>Traditional - claims, health assessment, labs, pharmacy, etc.<br>Non-traditional - behavioral marketing data, 3rd party consumer data, etc.<br>Integrates data sources into single, unified view across the enterprise (e.g. customer service, provider relations, Health Management, etc.)<br>Comprehensive consumer insight capabilities to identify consumer during their impact period<br>Consumer level financial and clinical impact analysis<br>Integrated informatics capabilities across the enterprise (e.g. actuarial, marketing, clinical, etc.) |

TABLE 5

Capability Assessment Model
Payer - Coordinate Healthcare Services
Identify Individual Intervention Opportunities Sub-Platform: Perform Health Management     Capability: Segment and Target

| Basic | Competitive | Market Leading |
|---|---|---|
| Interventions identified based on program definition and clinical guidelines (e.g. risk level, diagnoses, procedures, etc.)<br>Individual clinical judgment determines priority of interventions and consumers for outreach | Intervention opportunities identified using evidence-based medical (EBM) guidelines<br>Prioritized intervention opportunities based on defined clinical pathways which incorporate co-morbidities<br>Adherence to standardized quality measures for the highest level of accreditation (e.g. URAC/NCQA)<br>Population based financial and clinical impacts are incorporated into opportunity identification | Intervention opportunities identified based on consumer's individual clinical, financial, and lifestyle data<br>Systematically prioritized health and wealth intervention opportunities based on predicted level of clinical and financial impact for the specific consumer<br>Real time active monitoring and execution<br>Actual consumer level financial and clinical outcomes are utilized for ongoing improvements to opportunity identification |

TABLE 6

Capability Assessment Model
Payer - Coordinate Healthcare Services
Perform Proactive Outreach Sub-Platform: Perform Health Management     Capability: Reach and Engage

| Basic | Competitive | Market Leading |
|---|---|---|
| Mail and telephone outreach channels<br>Static assessments and scripting<br>Limited measurement of impact and value of campaigns<br>Use of high-cost, high-skilled resources for outreach | Addition of web-based channels (e.g. portal, email, chat, etc.)<br>Use of customer service/provider service as a channel for outreach<br>Dynamic assessments and scripting<br>Channel consumer to network providers and facilities<br>Measurement and analysis of campaign outcome<br>Use of non-clinical resources for outreach as appropriate | Segment specific outreach channels (e.g. satellite radio, magazine, online TV, etc.)<br>Personalized and consumer preferred channels for outreach<br>Personalized, intervention-specific assessments and scripting<br>Offer provider cost and quality data to empower and influence consumer decision-making<br>Active discussion with providers regarding comparative utilization data (e.g. cost and quality) to improve outcomes<br>Use of measurement and analysis of campaign outcomes to refine future campaigns<br>Use of law cost, high yield, non-clinical resources for outreach as appropriate |

TABLE 7

Capability Assessment Model
Payer - Coordinate Healthcare Services
Coordinate Care Sub-Platform: Perform Health Management | Capability: Reach and Engage

| Basic | Competitive | Market Leading |
|---|---|---|
| Execute authorization review: Authorization policies are broadly applied<br>Execute authorization review: Manual entry of fax and phone data<br>Execute authorization review: Multiple clinical criteria sets applied inconsistently (e.g. Interqual, Milliman, etc.)<br>Execute authorization review: Use of a non-leveraged clinical/non-clinical resource model for non-clinical transactions<br>Perform inpatient concurrent review and discharge planning: Onsite, intensive concurrent review with duplicative steps (e.g. manual, paper-based charting that is then typed into a system)<br>Perform inpatient concurrent review and discharge planning: Discharge planning is manual, reactionary, and silo'd<br>Manage appeals and grievances: Simple processes and systems (e.g. Access databases) to support resolution (typically fragmented with multiple handoffs)<br>Evaluate opportunities for programs/services: Opportunities identified based on chronic or episodic condition<br>Evaluate opportunities for programs/services: Opportunities driven by health plan business objectives<br>Develop care plan - Care plan is created based on chronic or episodic condition<br>Develop care plan - Care plan is driven by health plan business objectives<br>Coordinate and manage care plan - Simple processes and systems to support care plans which are stand-alone and segregated<br>Coordinate and manage care plan - Engagement, disengagement, graduation or step-down criteria for consumers based primarily on clinical judgment<br>Coordinate and manage care plan - Clinician access to providers to collect information and vendors/partners to provide services<br>Coordinate and manage care plan - Services conducted primarily via telephone and mail | Execute authorization review: Shift to automated notifications<br>Execute authorization review: Use of IVR, web and EDI to automate authorization data entry<br>Execute authorization review: Consistent clinical criteria set<br>Execute authorization review: Leveraged model with mix of clinical and non-clinical resources for non-clinical transactions<br>Perform inpatient concurrent review and discharge planning: Primarily telephonic concurrent review model<br>Perform inpatient concurrent review and discharge planning: Discharge planning is proactive with limited integration with other services<br>Manage appeals and grievances: Coordinated processes with customer service, provider service and claims processing; multiple systems to support appeals and grievances which are typically not integrated<br>Evaluate opportunities for programs/services: Intervention opportunities identified using evidence-based medical (EBM) guidelines<br>Evaluate opportunities for programs/services: Prioritized intervention opportunities based on defined clinical pathways which incorporate co-morbidities<br>Evaluate opportunities for programs/services: Obtain consumer understanding and consent regarding intervention opportunities driven by EBM guidelines<br>Develop care plan - Care plan is created based on intervention opportunities and clinical guidelines<br>Develop care plan - Obtain consumer understanding and consent regarding care plan driven by EBM guidelines<br>Coordinate and manage care plan - Coordinated processes within Health Management services; shared access to multiple systems to support care plan<br>Coordinate and manage care plan Standardized criteria used to determine engagement, disengagement, graduation or step-down criteria<br>Coordinate and manage care plan - Integrated care plan that defines and tracks goals and action items<br>Coordinate and manage care plan - Clinician access to subject matter advisors, providers, and vendors/partners to provide support according to consumer need<br>Coordinate and manage care plan - Provide interactive tools and content for consumer self-management<br>Coordinate and manage care plan - Ability to distribute care plan to consumer and provider<br>Coordinate and manage care plan - Addition of web-based channels (e.g. portal, email, etc.) | Execute authorization review: Focused authorization on high impact opportunities<br>Execute authorization review: Use of automated notifications to trigger programs and services<br>Execute authorization review: Use of clinical workflow tools and rules engine to support automated adjudication and distribution of authorizations/notifications<br>Execute authorization review: Non-clinical transactions supported by low cost, high yield, non-clinical resources as appropriate<br>Perform inpatient concurrent review and discharge planning: Shift to technology-based concurrent review transactions<br>Perform inpatient concurrent review and discharge planning: Focused telephonic concurrent review model (e.g. LOS outliers, facility outliers, etc.) with onsite for high volume facilities and specific cases<br>Perform inpatient concurrent review and discharge planning: Discharge planning is proactive, targeted, integrated with other services, and supported by automated tools<br>Manage appeals and grievances: Integrated processes and systems for coordination with customer service, provider service, and claims processing<br>Evaluate opportunities for programs/services: Intervention opportunities identified based on consumer's individual clinical, financial and lifestyle data<br>Evaluate opportunities for programs/services: Systematically prioritized health and wealth intervention opportunities based on predicted level of clinical and financial impact for the specific consumer<br>Evaluate opportunities for programs/services: Collaboration with consumer to personalize intervention opportunities<br>Develop care plan - Individualized, iterative care plan is created based on prioritized health and wealth intervention opportunities<br>Develop care plan - Collaboration with consumer to personalize care plan goals and activities<br>Coordinate and manage care plan - Integrated processes within Health Management services; access to integrated system to support care plan which includes both health and wealth intervention opportunities<br>Coordinate and manage care plan - Reputable, research based theories and models (TTM, PAM, motivational interviewing, etc.) are used as a foundation to determine engagement, disengagement, graduation and step-down criteria<br>Coordinate and manage care plan - Interactive care plan with ability to track goals and action items accessible via multiple channels with customized views for consumer and approved care team (e.g. Care Navigator, provider, designated caregiver, etc.)<br>Coordinate and manage care plan - Online Personal Health Record (PHR) maintained utilizing multiple data sources (e.g. claims, pharmacy, biometric data, lab data, etc.) and integrated with care plan<br>Coordinate and manage care plan - Single point of contact (e.g. primary care navigator) that coordinates with interdisciplinary team, enterprise functions (customer service, |

TABLE 7-continued

Capability Assessment Model
Payer - Coordinate Healthcare Services
Coordinate Care

| Sub-Platform: Perform Health Management | | Capability: Reach and Engage |
|---|---|---|
| Basic | Competitive | Market Leading |
| | | provider service, etc.) providers, and vendors/partners to provide support activities |
| | | Coordinate and manage care plan - Access to robust, integrated coaching tools that include trending capabilities, goal tracking and modeling |
| | | Coordinate and manage care plan - Multi-channel, personalized, interactive coaching customized to consumer and provider needs, objectives and preferences with broader access to person to person coaching, support groups, online chat, etc. |
| | | Coordinate and manage care plan - Collaboration with consumer to personalize care plan goals and activities |

TABLE 8

Capability Assessment Model
Payer - Coordinate Healthcare Services
Promote Optimal Lifestyle

| Sub-Platform: Perform Health Management | | Capability: Reach and Engage |
|---|---|---|
| Basic | Competitive | Market Leading |
| Lifestyle promotion limited to consumer health education (usually CM/DM nurses) Engagement, disengagement, graduation or step-down criteria for consumers based primarily on clinical judgment Interventions with consumers based primarily on episodic events or chronic condition Optional general health assessment is used to provide consumer's individual report and relevant content | Typical wellness programs offered include tobacco cessation, weight management, and stress management Tiered program options include buy-up to coaching performed by licensed or certified professionals (i.e. registered dietician, exercise physiologist, certified wellness coach, etc.) Basic behavior modification methods are used to determine engagement, disengagement, graduation and step-down criteria; includes creation of personalized action plan and coordinated goal setting Interventions with consumers based on triggers from general health assessments in addition to chronic conditions or episodic events Provide interactive tools and content for consumer self-management (sustainability) Offer optional purchaser sponsored health and wellness fairs | Optimal lifestyle programs evolving to include sleep, nutrition, exercise, and wealth management aligned with personalized reward programs and incentives Multi-channel, personalized, interactive coaching customized to consumer and provider needs, objectives and preferences with broader access to person to person coaching, support groups, online chat Reputable, research based theories and models (TTM, PAM, motivational interviewing, etc.) are used as a foundation to determine engagement, disengagement, graduation and step-down criteria Behavior modification skills and approach integrate into all Health Management services Interventions with consumers based on triggers from all available data sources (e.g. biometrics, lab data, health fair data, kiosk devices, genomics, etc. Pursue pilots/opportunities to leverage relationships, with other vendors/partners (e.g. pharmaceutical companies, PBM, etc.) Access to robust, integrated coaching tools that include trending capabilities, goal tracking and modeling |

TABLE 9

Capability Assessment Model
Payer - Coordinate Healthcare Services
Engage Provider

| Sub-Platform: Perform Health Management | | Capability: Collaborate and Support |
|---|---|---|
| Basic | Competitive | Market Leading |
| Collaboration on Health Management Program Design - Medical Directors meet with Professional Organizations to promote programs Treatment Opportunities - Disease | Collaboration on Health Management Program Design - Physicians are paid to participate in facilitated design sessions Treatment Opportunities - Notify provider, in timely manner, of treatment opportunities | Treatment Opportunities and Care Plans - Near real time, online notification of treatment opportunities (care gaps) and health risks of patients. Leverage provider connectivity channels |

TABLE 9-continued

Capability Assessment Model
Payer - Coordinate Healthcare Services
Engage Provider

| Sub-Platform: Perform Health Management | | Capability: Collaborate and Support |
|---|---|---|
| Basic | Competitive | Market Leading |
| management programs notify physician of patient participation in program Treatment Opportunities quarterly Provider Payment Strategies - Limited to provider contracts focused on fee schedules Decision Support - Paper based decision support - mostly in the form of newsletters and policy updates | (i.e., care gaps) and health risks of patients Treatment Opportunities - Paper based and usually monthly or quarterly Provider Payment Strategies - Provider payment strategies aligned with health outcomes, quality of care and interaction with health management programs and tools. Leverage this data to align fee schedules and contracts Provider Connectivity - Support timely, online interaction Provider Connectivity - Prior Authorizations Provider Connectivity - Referral network (specialist referrals) Provider Connectivity - Formulary information - cost, alternatives, drug-to-drug interactions Provider Connectivity - Real time eligibility Provider Connectivity - Real time claim adjudication to obtain near real time data for Care Management Decision Support - Support clinical decision making with: Access to evidence based guidelines Patient-specific administrative information (e.g., benefits information) Drug interaction and allergy warnings Identification of medication contraindications Provider Value Reports - Physicians receive yearly paper based reports that communicate: Provider Value Reports - Annual report on number of patients that have participated in Health Management Programs Provider Value Reports - Comparison of utilization trends - from past years and compared to peers Provider Value Reports - Usage of decision support tools | Treatment Opportunities and Care Plans - Provide access to web based care plan tool and reward physician for creation of care plan that can be shared with broader care team Provider Payment Strategies - Providers are incented to proactively manage their patient population (not just reactive medicine) including payments for: (e.g. patient centered medical home concept) Provider Payment Strategies - Work required to proactively review aggregate population and individual information to identify risks Provider Payment Strategies - Work that falls outside of the face-to-face visit to proactively care for patients Provider Payment Strategies - Payment for remote monitoring of clinical data using technology Provider Payment Strategies - Online reports to provider on status of incentive rewards Provider Connectivity - Support channels that provide near-real time patient information that is both portable and accessible to enable the provider (e.g. Physicians, ER, retail clinics) to make decisions during a patient encounter Provider Connectivity - Support timely, online interaction for: Provider Connectivity - Personal health Record information - with messages related to care gaps and risks identified Provider Connectivity - Cost Calculator - estimate physician payment and member out-of-pocket expense Decision Support - Support clinical decision making with: Patient-specific clinical information Cost-effective treatment options Identification of treatment adherence issues Provider Value Reports - Physicians receive value reports, online, quarterly - or on demand Provider Value Reports - Enhancements to quarterly reports that communicate: Provider Value Reports - Health outcomes achieved through Health Management programs - for physician population Provider Value Reports - Percentage achievement of goals to achieve reward dollars |

TABLE 10

Capability Assessment Model
Payer - Coordinate Healthcare Services
Engage Purchaser/Employer

| Sub-Platform: Perform Health Management | | Capability: Collaborate and Support |
|---|---|---|
| Basic | Competitive | Market Leading |
| Value Reporting - Paper based reports - usually once a year during contract renewal Value Reporting - Standard reporting is only available to mid to large sized accounts Value Reporting - Operational/process measures are reported (e.g. number of participants reached) - limited ROI reporting | Value Reporting - Standard value-based reports available on purchaser web site - target is large accounts Value Reporting - Automated report process, limited or no manual intervention Value Reporting - Value clearly articulated - clinical outcomes, financial outcomes and | Value Reporting - Offer online reporting to all accounts - regardless of size Value Reporting - Drill-down capability on online reports to do ad hoc analysis. Parameter Driven Reports and Interactive Reports that are created on demand Consultative Services - Automated purchaser |

TABLE 10-continued

Capability Assessment Model
Payer - Coordinate Healthcare Services
Engage Purchaser/Employer Sub-Platform: Perform Health Management    Capability: Collaborate and Support

| Basic | Competitive | Market Leading |
|---|---|---|
| Value Reporting - Manually intensive process to analyze data and limited recommendations based on member experience<br>Value Reporting - Medical Director goes with Sales Rep to represent Health Management<br>Consultative Services - Limited collaboration between Sales force and Care Management<br>Worksite Programs - Small number of health fairs conducted at time of open enrollment at large employers | operational efficiencies<br>Consultative Services - Conduct account-specific assessments to help clients improve their business to obtain a better ROI from their healthcare investments - target "A" Accounts<br>Consultative Services - Establish baselines, identify employer specific opportunities to manage health, make recommendations for programs, set annual goals/targets<br>Consultative Services - Manual analysis required<br>Consultative Services - Collaborate with the Account Manager to articulate care management solutions<br>Incentive Programs - Collaborate with employers to offer employer-funded incentives to employees<br>Incentive Programs - Report on employee uptake of incentive programs and impact of program on health outcomes<br>Worksite Programs - Collaborate with Purchasers to support health fairs, lunch and learns, and other wellness programs. Prioritize accounts to optimize use of limited resources<br>Worksite Programs - Develop Employer "tool-kits" with example programs and materials to initiate employer wellness initiatives | opportunity analysis with rules that create recommendations for programs, metrics and targets<br>Incentive Programs - Create employer incentives for encouraging healthy behaviors within employee population. Annually, modify contracts/premiums based on percent of employee population that achieved agreed upon goals<br>Worksite Programs - Collaborate with large employers to set up onsite health clinics with broad spectrum of non-urgent services (e.g., symptom advice/treatment, condition coaching, etc.)<br>Worksite Programs - Create new innovative employee health management services (e.g., health concierge services, health/wealth retirement planning) |

TABLE 11

Capability Assessment Model
Payer - Coordinate Healthcare Services
Manage Results Sub-Platform: Perform Health Management    Capability: Evaluate and Improve

| Basic | Competitive | Market Leading |
|---|---|---|
| Enterprise-wide measurement methodology defined by health plan<br>Paper-based report distribution<br>Manual reporting for regulatory compliance, contractual obligations and operational management | Engagement of stakeholders in determining measurement methodology<br>Electronic report distribution<br>Annual reporting on outcomes and ROI for operational management, provider performance and purchaser value reporting<br>Vendor Data is included in reports<br>Ability to perform metrics evaluation compared to expected thresholds<br>Dedicated team to manage standard reports and ad hoc reports for root cause analysis<br>Leverage root cause analysis for internal continuous improvement | Collaboration with stakeholders to determine measurement methodology leveraging industry standards<br>Executive dashboard generated to understand high-level cost and utilization trends across the enterprise<br>Dynamic, interactive, individualized reports with drill-down capabilities and identification of actionable items<br>On-demand reporting on outcomes and ROI for operational management, provider performance and purchaser value reporting<br>Seamless, systematic incorporation of vendor data<br>Executive accountability and ownership for enterprise-wide healthcare informatics<br>Leverage real time predictive analysis for trending and alerts with defined actionable items<br>Leverage results management capabilities for stakeholder continuous improvement |

TABLE 12

Capability Assessment Model
Payer - Coordinate Healthcare Services
Communicate Value to Stakeholders Sub-Platform: Perform Health Management     Capability: Evaluate and Improve

| Basic | Competitive | Market Leading |
|---|---|---|
| Paper-based explanation of benefits (EOB) | Paper-based personalized health statements | Electronic, dynamic, integrated personal health statements with actionable targeted messaging<br>Interactive modeling<br>Personalized ROI reports with ability to do interactive modeling (i.e. ability for consumers to adapt/change inputs) |

TABLE 13

Capability Assessment Model
Payer - Coordinate Healthcare Services
Provide Account Specific Consultative Services Sub-Platform: Perform Health Management     Capability: Evaluate and Improve

| Basic | Competitive | Market Leading |
|---|---|---|
| Utilize reports to monitor utilization and program efficiency to determine if services need to be added or modified<br>Basic set of reports handed off to account representative with limited analysis<br>Ad hoc purchaser data generated upon purchaser request, limited by health plan capability<br>Customer understanding and relationship development is an "art" versus fact and data driven<br>Basic delivery approach and processes driven by reaction to purchaser requests (typically inconsistent, segmented and silo'd) | Utilize reports to monitor utilization, program efficiency, and value to determine if services need to be added or modified<br>Basic set of reports provided to account representative with analysis and interpretation<br>Customer understanding and relationship development is data driven and fact-based utilizing internal and external sources<br>Defined delivery approach and processes leveraging Health Management advisors on an as needed basis | Comprehensive, interactive reports with in-depth analysis and interpretation including productivity, absenteeism, and presenteeism<br>Account representatives have the training and tools to perform interactive, dynamic opportunity assessment and program planning<br>Health Management advisors involved in consultative sales process<br>Customer understanding and relationship development is trust-based, interactive, and reflects the depth of knowledge on the customer obtained from personal interactions, understanding of the customer's strategic objectives and relevant data<br>Collaborative approach driven by insight to proactively identify customer needs to achieve strategic objectives |

TABLE 14

Capability Assessment Model
Payer - Coordinate Healthcare Services
Provide Decision Support Sub-Platform: Perform Health Management     Capability: Research and Engage

| Basic | Competitive | Market Leading |
|---|---|---|
| Focused on treatment option decisions for chronic or episodic conditions to support CM/DM<br>Guidance on health care options provided according to health plan guidelines and policy<br>Access to static information based on medical policy | Focused on health decisions for preference sensitive conditions based on health plan ROI (e.g. pain management, surgery, fertility, oncology decisions, etc.)<br>Proactive identification of consumers through "trigger list" of diagnoses and procedures<br>Access to static information based on evidence-based medical guidelines<br>Coaching consumer to have appropriate dialog with provider (e.g. developing list of questions, creating checklist, etc.)<br>Access to clinical decision support content, clinical care paths, basic cost and quality data (e.g. Subimo, CMS, etc.)<br>Access to subject matter advisors to provide decision support according to consumer need | Offer full spectrum of health and wealth decision support based on consumer needs (e.g. provider selection, medication therapy, palliative care, medical tourism, etc.)<br>Proactive identification of consumers during optimal impact period through predictive analysis<br>Multi-channel access to interactive, customized content, messaging and tools (e.g. cost calculators, decisions trees, etc.) regarding health and wealth options, including access to interactive personal health and wealth advisor services<br>Support consumer dialog with provider (e.g. coaching, joint conversation, etc.)<br>Ability for consumer to access health plan and consumer rating information on providers (e.g. quality, cost, consumer satisfaction data, etc.)<br>Access to interdisciplinary team to provide decision support according to consumer need |

We claim:

1. A computer-implemented method for high-performance capability assessment of a health and life sciences business, comprising:
 providing a processor operatively coupled to a communication network;
 providing a database operatively coupled to the processor and accessible through the communication network;
 coupling an interface to the processor for receiving input;
 defining, by the processor coupled to a machine-readable memory in the database, a multidimensional health and life sciences industry performance reference set comprising multiple key assessment performance reference tables, at least one key assessment performance reference table defining a sub-platform for performing health care management, including:
  a 'Basic' performance level specifying 'Basic' performance assessment criteria;
  a 'Competitive' performance level specifying 'Competitive' performance assessment criteria;
  a 'Market Leading' performance level specifying 'Market Leading' performance assessment criteria;
 establishing a coordinate care assessment criteria,
  wherein the 'Basic' performance assessment criteria includes a first criteria for execution of authorization review where authorization policies are broadly applied;
  wherein the 'Competitive' performance assessment criteria includes a first criteria for execution of authorization review where a shift to automated notifications occurs;
  wherein the 'Market Leading' performance assessment criteria includes a first criteria for execution of authorization review where focused authorization on high impact opportunities exists;
 receiving, through the communication network, an input specifying a health and life sciences industry area and a health and life sciences industry key assessment area with the health and life sciences industry area for analysis;
 searching, by the processor, the multidimensional health and life sciences industry performance reference set for a matching key assessment performance reference table that matches the health and life sciences industry area and the health and life sciences industry key assessment area;
 retrieving, by the processor, the matching key assessment performance reference table;
 analyzing, by the processor, the matching key assessment performance reference table; and
 obtaining, by the processor, a resultant performance level for the health and life sciences industry key assessment area.

2. A computer-implemented method for high-performance capability assessment of a health and life sciences business, comprising:
 providing a processor operatively coupled to a communication network;
 providing a database operatively coupled to the processor and accessible through the communication network;
 coupling an interface to the processor for receiving input;
 defining, by the processor coupled to a machine-readable memory in the database, a multidimensional health and life sciences industry performance reference set comprising multiple key assessment performance reference tables, at least one key assessment performance reference table defining a sub-platform for performing health care management, including:
  a 'Basic' performance level specifying 'Basic' performance assessment criteria;
  a 'Competitive' performance level specifying 'Competitive' performance assessment criteria;
  a 'Market Leading' performance level specifying 'Market Leading' performance assessment criteria;
 establishing a coordinate care assessment criteria,
  wherein the 'Basic' performance assessment criteria includes
  a first criteria for execution authorization review where manual entry of fax and phone data exists;
  wherein the 'Competitive' performance assessment criteria includes
  a first criteria for execution authorization review where use of IVR, web and EDI exists to automate authorization data entry;
  wherein the 'Market Leading' performance assessment criteria includes
  a first criteria for execution authorization review where use of automated notifications triggers programs and services
 receiving, through the communication network, an input specifying a health and life sciences industry area and a health and life sciences industry key assessment area with the health and life sciences industry area for analysis;
 searching, by the processor, the multidimensional health and life sciences industry performance reference set for a matching key assessment performance reference table that matches the health and life sciences industry area and the health and life sciences industry key assessment area
 retrieving, by the processor, the matching key assessment performance reference table;
 analyzing, by the processor, the matching key assessment performance reference table; and
 obtaining, by the processor, a resultant performance level for the health and life sciences industry key assessment area.

3. A computer-implemented method for high-performance capability assessment of a health and life sciences business, comprising:
 providing a processor operatively coupled to a communication network;
 providing a database operatively coupled to the processor and accessible through the communication network;
 coupling an interface to the processor for receiving input;
 defining, by the processor coupled to a machine-readable memory in the database, a multidimensional health and life sciences industry performance reference set comprising multiple key assessment performance reference tables, at least one key assessment performance reference table defining a sub-platform for performing health care management, including:
  a 'Basic' performance level specifying 'Basic' performance assessment criteria;
  a 'Competitive' performance level specifying 'Competitive' performance assessment criteria;
  a 'Market Leading' performance level specifying 'Market Leading' performance assessment criteria;
 establishing a promotion of optimal lifestyle assessment criteria,
  wherein the 'Basic' performance assessment criteria includes a first criteria where engagement, disengagement, graduation or step-down criteria for consumers is based primarily on clinical judgment;
  wherein the 'Competitive' performance assessment criteria includes
    a first criteria where tiered program options include buy-up to coaching is performed by licensed or certified professionals;
      wherein the 'Market Leading' performance assessment criteria includes
        a first criteria where multi-channel, personalized interactive coaching is customized to consumer and provider needs, objectives and preferences, which provides broader access to person to person coaching, support groups, and online chat;
receiving, through the communication network, an input specifying a health and life sciences industry area and a health and life sciences industry key assessment area with the health and life sciences industry area for analysis;
searching, by the processor, the multidimensional health and life sciences industry performance reference set for a matching key assessment performance reference table that matches the health and life sciences industry area and the health and life sciences industry key assessment area;
retrieving, by the processor, the matching key assessment performance reference table;
analyzing, by the processor, the matching key assessment performance reference table; and
obtaining, by the processor, a resultant performance level for the health and life sciences industry key assessment area.

4. The computer-implemented method of claim 1, further including establishing a provide decision support assessment criteria,
  wherein the 'Basic' performance assessment criteria includes
    a second criteria where guidance on health care options are provided according to health plan guidelines and policy;
  wherein the 'Competitive' performance assessment criteria includes
    a second criteria where proactive identification of consumers through "trigger list" of diagnoses and procedures exists; and
  wherein the 'Market Leading' performance assessment criteria includes
    a second criteria where proactive identification of consumers during optimal impact period through predictive analysis exists.

5. The computer-implemented method of claim 1, further including establishing a design campaigns assessment criteria,
  wherein the 'Basic' performance assessment criteria includes
    a second criteria where limited metrics are defined to measure impact and value of campaign;
  wherein the 'Competitive' performance assessment criteria includes a second criteria where purchaser driven campaign identification and design exists; and
  wherein the 'Market Leading' performance assessment criteria includes a second criteria where segment specific outreach channels exist.

6. The computer-implemented method of claim 1, further including establishing an identify individual intervention opportunities assessment criteria,
  wherein the 'Basic' performance assessment criteria includes a second criteria where individual clinical judgment determines priority of interventions and consumers for outreach;
  wherein the 'Competitive' performance assessment criteria includes a second criteria where prioritized intervention opportunities are based on defined clinical pathways which incorporate co-morbidities; and
  wherein the 'Market Leading' performance assessment criteria includes a second criteria where systematic prioritized health and wealth intervention opportunities are based on predicted level of clinical and financial impact for the specific consumer.

7. A non-transient computer-readable memory or data storage means encoded with data representing a computer program for a high-performance capability assessment of a health and life sciences business, the computer-readable memory or data storage means causing the computer to perform the acts of:
  operatively coupling a processor to a communication network;
  operatively coupling a database to the processor, the database accessible through the communication network;
  coupling an interface to the processor for receiving input;
  establishing, by the processor, a machine-readable memory in said database, including a multidimensional health and life sciences industry performance reference set comprising multiple key assessment performance reference tables, at least one key assessment performance reference table defining a sub-platform for performing health care management, including:
    a 'Basic' performance level specifying 'Basic' performance assessment criteria;
    a 'Competitive' performance level specifying 'Competitive' performance assessment criteria;
    a 'Market Leading' performance level specifying 'Market leading' performance assessment criteria;
  establishing a coordinate care assessment criteria,
    wherein the 'Basic' performance assessment criteria includes a first criteria for execution of authorization review where authorization policies are broadly applied;
    wherein the 'Competitive' performance assessment criteria includes a first criteria for execution of authorization review where a shift to automated notifications occurs;
    wherein the 'Market Leading' performance assessment criteria includes a first criteria for execution of authorization review where focused authorization on high impact opportunities exists;
  receiving, by the processor, an input specifying a health and life sciences industry area and a health and life sciences industry key assessment area with the health and life sciences industry area for analysis;
  searching, by the processor, the multidimensional health and life sciences industry performance reference set for a matching key assessment performance reference table that matches the health and life sciences industry area and the health and life sciences industry key assessment area;
  retrieving, by the processor, the matching key assessment performance reference table;
  analyzing, by the processor, the matching key assessment performance reference table; and
  obtaining, by the processor, a resultant performance level for the health and life sciences industry key assessment area.

8. A non-transient computer-readable memory or data storage means encoded with data representing a computer program for a high-performance capability assessment of a health and life sciences business, the computer-readable memory or data storage means causing the computer to perform the acts of:
   operatively coupling a processor to a communication network;
   operatively coupling a database to the processor, the database accessible through the communication network;
   coupling an interface to the processor for receiving input;
   establishing, by the processor, a machine-readable memory in said database, including a multidimensional health and life sciences industry performance reference set comprising multiple key assessment performance reference tables, at least one key assessment performance reference table defining a sub-platform for performing health care management, including:
      a 'Basic' performance level specifying 'Basic' performance assessment criteria;
      a 'Competitive' performance level specifying 'Competitive' performance assessment criteria;
      a 'Market Leading' performance level specifying 'Market leading' performance assessment criteria;
   establishing a coordinate care assessment criteria,
      wherein the 'Basic' performance assessment criteria includes:
      a first criteria where execution of authorization review policies are broadly applied;
      wherein the 'Competitive' performance assessment criteria includes a first criteria where execution authorization review shifts to automated notifications;
      wherein the 'Market Leading' performance assessment criteria includes a first criteria where execution authorization review is focused on high impact opportunities;
   receiving, by the processor, an input specifying a health and life sciences industry area and a health and life sciences industry key assessment area with the health and life sciences industry area for analysis;
   searching, by the processor, the multidimensional health and life sciences industry performance reference set for a matching key assessment performance reference table that matches the health and life sciences industry area and the health and life sciences industry key assessment area;
   retrieving, by the processor, the matching key assessment performance reference table;
   analyzing, by the processor, the matching key assessment performance reference table; and
   obtaining, by the processor, a resultant performance level for the health and life sciences industry key assessment area.

9. A non-transient computer-readable memory or data storage means encoded with data representing a computer program for a high-performance capability assessment of a health and life sciences business, the computer-readable memory or data storage means causing the computer to perform the acts of:
   operatively coupling a processor to a communication network;
   operatively coupling a database to the processor, the database accessible through the communication network;
   coupling an interface to the processor for receiving input;
   establishing, by the processor, a machine-readable memory in said database, including a multidimensional health and life sciences industry performance reference set comprising multiple key assessment performance reference tables, at least one key assessment performance reference table defining a sub-platform for performing health care management, including:
      a 'Basic' performance level specifying 'Basic' performance assessment criteria;
      a 'Competitive' performance level specifying 'Competitive' performance assessment criteria;
      a 'Market Leading' performance level specifying 'Market leading' performance assessment criteria;
   establishing a promote optimal lifestyle assessment criteria,
      wherein the 'Basic' performance assessment criteria includes a first criteria where lifestyle promotion is limited to consumer health education
      wherein the 'Competitive' performance assessment criteria includes a first criteria where typical wellness programs offered include tobacco cessation, weight management, and stress management;
      wherein the 'Market Leading' performance assessment criteria includes a first criteria where optimal lifestyle programs evolving to include sleep, nutrition, exercise, and wealth management aligned with personalized reward programs and incentives;
   receiving, by the processor, an input specifying a health and life sciences industry area and a health and life sciences industry key assessment area with the health and life sciences industry area for analysis;
   searching, by the processor, the multidimensional health and life sciences industry performance reference set for a matching key assessment performance reference table that matches the health and life sciences industry area and the health and life sciences industry key assessment area
   retrieving, by the processor, the matching key assessment performance reference table;
   analyzing, by the processor, the matching key assessment performance reference table; and
   obtaining, by the processor, a resultant performance level for the health and life sciences industry key assessment area.

10. The non-transient computer-readable medium of claim 7 further comprising computer-readable content to cause a computer to perform acts of establishing a provide decision support assessment criteria,
   wherein the 'Basic' performance assessment criteria includes a second criteria where guidance on health care options is provided according to health plan guidelines and policy;
   wherein the 'Competitive' performance assessment criteria includes a second criteria where proactive identification of consumers through "trigger list" of diagnoses and procedures exist; and
   wherein the 'Market Leading' performance assessment criteria includes a second criteria where proactive identification of consumers during optimal impact period is performed through predictive analysis.

11. The non-transient computer-readable medium of claim 7 further comprising computer-readable content to cause a computer to perform acts of establishing a design campaigns assessment criteria,
   wherein the 'Basic' performance assessment criteria includes
   a second criteria where limited metrics are defined to measure impact and value of campaign;

wherein the 'Competitive' performance assessment criteria includes a second criteria where purchaser driven campaign identification and design exists; and wherein the 'Market Leading' performance assessment criteria includes a second criteria where segment specific outreach channels exist.

12. The non-transient computer-readable medium of claim 7 further comprising computer-readable content to cause a computer to perform acts of establishing an identify individual intervention opportunities assessment criteria, wherein the 'Basic' performance assessment criteria includes a second criteria where individual clinical judgment determines priority of interventions and consumers for outreach;

wherein the 'Competitive' performance assessment criteria includes a second criteria where prioritized intervention opportunities based on defined clinical pathways which incorporate co-morbidities, exist; and wherein the 'Market Leading' performance assessment criteria includes a second criteria where systematic prioritized health and wealth intervention opportunities are based on predicted level of clinical and financial impact for the specific consumer.

13. A system for high-performance capability assessment of a health and life sciences business, comprising:

a processor operatively coupled to a communication network;

an interface coupled to the processor configured to receive input;

a database operatively coupled to the processor and accessible through the communication network;

a machine-readable memory operatively located in said database, said memory including a multidimensional health and life sciences industry performance reference set comprising multiple key assessment performance reference tables, at least one key assessment performance reference table defining a sub-platform for performing health care management including:

a 'Basic' performance level specifying 'Basic' performance assessment criteria;

a 'Competitive' performance level specifying 'Competitive' performance assessment criteria;

a 'Market Leading' performance level specifying 'Market leading' performance assessment criteria;

establishing a coordinate care assessment criteria, wherein the 'Basic' performance assessment criteria includes a first criteria for execution of authorization review where authorization policies are broadly applied;

wherein the 'Competitive' performance assessment criteria includes a first criteria for execution of authorization review where a shift to automated notifications occurs;

wherein the 'Market Leading' performance assessment criteria includes a first criteria for execution of authorization review where focused authorization on high impact opportunities exists;

the interface receiving an input specifying a health and life sciences industry area and a health and life sciences industry key assessment area with the health and life sciences industry area for analysis;

wherein the processor searches the multidimensional health and life sciences industry performance reference set for a matching key assessment performance reference table that matches the health and life sciences industry area and the health and life sciences industry key assessment area, and retrieves the matching key assessment performance reference table; and wherein the processor performs analysis of the matching key assessment performance reference table; and obtains a resultant performance level for the health and life sciences industry key assessment area.

14. A system for high-performance capability assessment of a health and life sciences business, comprising:

a processor operatively coupled to a communication network;

an interface coupled to the processor configured to receive input;

a database operatively coupled to the processor and accessible through the communication network;

a machine-readable memory operatively located in said database, said memory including a multidimensional health and life sciences industry performance reference set comprising multiple key assessment performance reference tables, at least one key assessment performance reference table defining a sub-platform for performing health care management, including:

a 'Basic' performance level specifying 'Basic' performance assessment criteria;

a 'Competitive' performance level specifying 'Competitive' performance assessment criteria;

a 'Market Leading' performance level specifying 'Market leading' performance assessment criteria;

the processor establishing a coordinate care assessment criteria, wherein the 'Basic' performance assessment criteria includes a first criteria where authorization policies are broadly applied;

wherein the 'Competitive' performance assessment criteria includes a first criteria where execution authorization review shift to automated notifications;

wherein the 'Market Leading' performance assessment criteria includes a first criteria where execution of authorization review includes focused authorization on high impact opportunities;

the interface receiving an input specifying a health and life sciences industry area and a health and life sciences industry key assessment area with the health and life sciences industry area for analysis;

wherein the processor searches the multidimensional health and life sciences industry performance reference set for a matching key assessment performance reference table that matches the health and life sciences industry area and the health and life sciences industry key assessment area, and retrieves the matching key assessment performance reference table; and wherein the processor performs analysis of the matching key assessment performance reference table; and obtains a resultant performance level for the health and life sciences industry key assessment area.

15. A system for high-performance capability assessment of a health and life sciences business, comprising:

a processor operatively coupled to a communication network;

an interface coupled to the processor configured to receive input;

a database operatively coupled to the processor and accessible through the communication network;

a machine-readable memory operatively located in said database, said memory including a multidimensional health and life sciences industry performance reference set comprising multiple key assessment performance reference tables, at least one key assessment performance reference table defining a sub-platform for performing health care management, including:
- a 'Basic' performance level specifying 'Basic' performance assessment criteria;
- a 'Competitive' performance level specifying 'Competitive' performance assessment criteria;
- a 'Market Leading' performance level specifying 'Market leading' performance assessment criteria;

the processor establishing a promotion of optimal lifestyle assessment criteria,
- wherein the 'Basic' performance assessment criteria includes a first criteria where lifestyle promotion is limited to consumer health education
- wherein the 'Competitive' performance assessment criteria includes a first criteria where typical wellness programs offered include tobacco cessation, weight management, and stress management;
- wherein the 'Market Leading' performance assessment criteria includes a first criteria where optimal lifestyle programs evolve to include sleep, nutrition, exercise, and wealth management aligned with personalized reward programs and incentives;

the interface receiving an input specifying a health and life sciences industry area and a health and life sciences industry key assessment area with the health and life sciences industry area for analysis;

wherein the processor searches the multidimensional health and life sciences industry performance reference set for a matching key assessment performance reference table that matches the health and life sciences industry area and the health and life sciences industry key assessment area, and retrieves the matching key assessment performance reference table; and wherein the processor performs analysis of the matching key assessment performance reference table; and obtains a resultant performance level for the health and life sciences industry key assessment area.

16. The system of claim 13, wherein the processor establishes a provide decision support assessment criteria,
- wherein the 'Basic' performance assessment criteria includes
- a second criteria where guidance on health care options are provided according to health plan guidelines and policy;
- wherein the 'Competitive' performance assessment criteria includes
- a second criteria where proactive identification of consumers through "trigger list" of diagnoses and procedures exist; and
- wherein the 'Market Leading' performance assessment criteria includes
- a second criteria where proactive identification of consumers during optimal impact period occurs through predictive analysis.

17. The system of claim 13, wherein the processor establishes a design campaigns assessment criteria,
- wherein the 'Basic' performance assessment criteria includes
- a second criteria where limited metrics are defined to measure impact and value of campaign;
- wherein the 'Competitive' performance assessment criteria includes
- a second criteria where purchaser driven campaign identification and design exists;
- wherein the 'Market Leading' performance assessment criteria includes
- a second criteria where segment specific outreach channels exist.

18. The system of claim 13, wherein the processor establishes an identify individual intervention opportunities assessment criteria,
- wherein the 'Basic' performance assessment criteria includes
- a second criteria where individual clinical judgment determines priority of interventions and consumers for outreach;
- wherein the 'Competitive' performance assessment criteria includes
- a second criteria where prioritized intervention opportunities are based on defined clinical pathways which incorporate co-morbidities; and
- wherein the 'Market Leading' performance assessment criteria includes
- a second criteria where systematic prioritized health and wealth intervention opportunities are based on predicted level of clinical and financial impact for the specific consumer.

* * * * *